United States Patent
Hattori et al.

(10) Patent No.: US 11,420,413 B2
(45) Date of Patent: Aug. 23, 2022

(54) LAMINATE, OPTICAL MEMBER, AND OPTICAL APPARATUS

(71) Applicant: NITTO DENKO CORPORATION, Ibaraki (JP)

(72) Inventors: Daisuke Hattori, Ibaraki (JP); Ryota Morishima, Ibaraki (JP); Atsushi Kishi, Ibaraki (JP); Akiko Sugino, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 29 days.

(21) Appl. No.: 16/832,563

(22) Filed: Mar. 27, 2020

(65) Prior Publication Data

US 2020/0223175 A1 Jul. 16, 2020

Related U.S. Application Data

(63) Continuation of application No. PCT/JP2018/036343, filed on Sep. 28, 2018.

(30) Foreign Application Priority Data

Sep. 29, 2017 (JP) .............................. JP2017-190746
Sep. 26, 2018 (JP) .............................. JP2018-180954

(51) Int. Cl.
*B32B 5/18* (2006.01)
*C09J 7/38* (2018.01)
(Continued)

(52) U.S. Cl.
CPC .................. *B32B 5/18* (2013.01); *B32B 7/12* (2013.01); *B32B 27/065* (2013.01); *C09J 7/26* (2018.01);
(Continued)

(58) Field of Classification Search
CPC .......... B32B 5/18; B32B 7/12; B32B 27/065; B32B 2551/00; B32B 7/10; B32B 27/308;
(Continued)

(56) References Cited

U.S. PATENT DOCUMENTS

2009/0042004 A1 2/2009 Yano et al.
2009/0087650 A1 4/2009 Inoue et al.
(Continued)

FOREIGN PATENT DOCUMENTS

EP 3 575 374 A1 12/2019
EP 3 689 953 A1 8/2020
(Continued)

OTHER PUBLICATIONS

International Search Report dated Nov. 13, 2018, issued in counterpart application No. PCT/JP2018/036343 (2 pages).
(Continued)

*Primary Examiner* — Nathan L Van Sell
(74) *Attorney, Agent, or Firm* — WHDA, LLP

(57) ABSTRACT

The present invention provides a laminate of a void-containing layer and a pressure-sensitive adhesive/adhesive layer that achieves both a pressure-sensitive adhesive force or an adhesive force and a reduction of a tendency of a pressure-sensitive adhesive or an adhesive to penetrate into voids. The first laminate of the present invention includes: a void-containing layer (20); and a pressure-sensitive adhesive/adhesive layer (30), wherein the pressure-sensitive adhesive/adhesive layer (30) is directly laminated on one or both sides of the void-containing layer (20), the void-containing layer (20) has a void fraction of 35 vol % or more, and, after a heat/humidification durability test of holding at a temperature of 85° C. and a relative humidity of 85% for 500 hours, a void remaining ratio of the void-
(Continued)

containing layer (20) is 50 vol % or more before the heat/humidification durability test.

12 Claims, 3 Drawing Sheets

(51) Int. Cl.
   *C09J 7/26* (2018.01)
   *B32B 7/12* (2006.01)
   *B32B 27/06* (2006.01)
(52) U.S. Cl.
   CPC ........... *C09J 7/385* (2018.01); *B32B 2551/00* (2013.01); *C09J 2433/00* (2013.01)
(58) Field of Classification Search
   CPC . C09J 7/385; C09J 7/26; C09J 2433/00; C09J 2203/318; C09J 133/06; C09J 7/29; G02B 1/111; F21S 2/00; C08F 220/10; C08F 220/28; C08F 220/06
   See application file for complete search history.

(56) References Cited

U.S. PATENT DOCUMENTS

| | | | |
|---|---|---|---|
| 2011/0014410 | A1 | 1/2011 | Kishioka et al. |
| 2017/0240782 | A1* | 8/2017 | Suwa .................. C09J 133/066 |
| 2017/0349784 | A1 | 12/2017 | Haruta et al. |
| 2018/0215124 | A1 | 8/2018 | Hattori et al. |
| 2018/0224580 | A1 | 8/2018 | Hattori et al. |

FOREIGN PATENT DOCUMENTS

| | | | | |
|---|---|---|---|---|
| JP | 10-062626 | A | 3/1998 | |
| JP | 3878386 | B2 | 2/2007 | |
| JP | 2007-138147 | A | 6/2007 | |
| JP | 2011-21109 | A | 2/2011 | |
| JP | 4811973 | B2 * | 11/2011 | ............... C09K 7/02 |
| JP | 2012-156082 | A | 8/2012 | |
| JP | 5415658 | B2 | 2/2014 | |
| JP | 2014-46518 | A | 3/2014 | |
| JP | 2017-025277 | A | 2/2017 | |
| WO | 2007/108363 | A1 | 9/2007 | |
| WO | 2017/010502 | A1 | 1/2017 | |
| WO | 2017/022690 | A1 | 2/2017 | |
| WO | 2017/043496 | A1 | 3/2017 | |
| WO | 2018/142813 | A1 | 8/2018 | |

OTHER PUBLICATIONS

Office Action dated Nov. 4, 2021, issued in counterpart CN Application No. 201880063213.5, with Partial English Translation. (18 pages).
Office Action dated Nov. 26, 2021, issued in counterpart TW Application No. 107134350, with Partial English Translation. (30 pages).
Extended (Supplementary) European Search Report dated Jul. 23, 2021, issued in counterpart EP application No. 18860750.1. (22 pages).
Office Action dated May 10, 2022, issued in counterpart JP Application No. 2018-180954, with English translation. (8 pages).
Office Action dated May 13, 2022, issued in counterpart TW application No. 107134350, with partial English translation (14 pages).

* cited by examiner

LAMINATE, OPTICAL MEMBER, AND OPTICAL APPARATUS

TECHNICAL FIELD

The present invention relates to a laminate, an optical member, and an optical apparatus.

BACKGROUND ART

In an optical device, for example, an air layer having a low refractive index is used as a total reflection layer. Specifically, for example, optical film members (e.g., a light guide plate and a reflector) in a liquid crystal device are laminated with an air layer interposed therebetween.

However, when the respective members are separated from each other by an air layer, particularly in a case where the members are large in size, problems such as distortion of the members may arise. In addition, due to trends toward thinner devices, it is desired to integrate the respective members. For this reason, the respective members are integrated by a pressure-sensitive adhesive/adhesive without an air layer interposed therebetween (Patent Literature 1). However, if there is no air layer serving as a total reflection layer, optical characteristics may become poor, which causes light leakage.

Therefore, it has been proposed to use a low refractive index layer instead of an air layer. For example, Patent Literature 2 describes a structure in which a light guide plate and a reflector are laminated via a layer having a lower refractive index than that of the light guide plate. As the low refractive index layer, for example, a void-containing layer having voids is used in order to make the refractive index low as close as possible to air.

CITATION LIST

Patent Literature

Patent Literature 1: JP 2012-156082 A
Patent Literature 2: JPH10(1998)-62626 A

SUMMARY OF INVENTION

Technical Problem

For example, the void-containing layer is laminated on another layer with a pressure-sensitive adhesive/adhesive layer interposed therebetween to use. However, when laminating the void-containing layer and the pressure-sensitive adhesive/adhesive layer, the pressure-sensitive adhesive or adhesive constituting the pressure-sensitive adhesive/adhesive layer may penetrate into the voids of the void-containing layer to fill the voids, which lowers the void fraction. The higher the void fraction of the void-containing layer, the more likely the pressure-sensitive adhesive or adhesive will penetrate. In a high-temperature environment, the pressure-sensitive adhesive or adhesive is prone to penetrate into the voids by the molecular motion of the pressure-sensitive adhesive or adhesive.

In order to suppress or prevent the penetration of the pressure-sensitive adhesive or adhesive into the voids, the pressure-sensitive adhesive or the adhesive having an elastic modulus as high as possible (hard) may be used. However, if the elastic modulus of the pressure-sensitive adhesive or adhesive is high (hard), the pressure-sensitive adhesive force or the adhesive force may be lowered. Conversely, if the elastic modulus of the pressure-sensitive adhesive or adhesive is low (soft), although a high pressure-sensitive adhesive force or an adhesive force is readily obtained, the pressure-sensitive adhesive or adhesive may be prone to penetrate into the voids.

Accordingly, it is an object of the present invention to provide a laminate of a void-containing layer and a pressure-sensitive adhesive/adhesive layer that achieves both a pressure-sensitive adhesive force or an adhesive force and a reduction of a tendency of a pressure-sensitive adhesive or an adhesive to penetrate into voids, and to also provide an optical member and an optical apparatus including the laminate.

Solution to Problem

In order to achieve the above object, the present invention provides a first laminate including: a void-containing layer; and a pressure-sensitive adhesive/adhesive layer, wherein the pressure-sensitive adhesive/adhesive layer is directly laminated on one or both sides of the void-containing layer, the void-containing layer has a void fraction of 35 vol % or more, and, after a heat/humidification durability test of holding at a temperature of 85° C. and a relative humidity of 85% for 500 hours, a void remaining ratio of the void-containing layer is 50 vol % or more of the void remaining ratio before the heat/humidification durability test.

The present invention also provides a second laminate including: a void-containing layer; and a pressure-sensitive adhesive/adhesive layer, wherein the pressure-sensitive adhesive/adhesive layer is directly laminated on one or both sides of the void-containing layer, the void-containing layer has a void fraction of 35 vol % or more, the pressure-sensitive adhesive/adhesive layer is formed of a pressure-sensitive adhesive containing a (meth)acrylic polymer and a crosslinking agent, the pressure-sensitive adhesive/adhesive layer has a gel fraction of 70% or more, the pressure-sensitive adhesive/adhesive layer has a thickness of 2 to 50 μm, and the pressure-sensitive adhesive/adhesive layer satisfies the following equation (I):

$$[(100-X)/100] \times Y \leq 10 \quad (I)$$

where in the equation (I),
X is the gel fraction (%) of the pressure-sensitive adhesive/adhesive layer, and
Y is the thickness (μm) of the pressure-sensitive adhesive/adhesive layer.

The present invention also provides a third laminate including: a void-containing layer; and a pressure-sensitive adhesive/adhesive layer, wherein the pressure-sensitive adhesive/adhesive layer is directly laminated on one or both sides of the void-containing layer, the void-containing layer has a void fraction of 35 vol % or more, the pressure-sensitive adhesive/adhesive layer is formed of a pressure-sensitive adhesive containing a (meth)acrylic polymer and a crosslinking agent, and the (meth)acrylic polymer is a (meth)acrylic polymer having a weight-average molecular weight of 1,500,000 to 2,800,000 obtained by polymerizing 3 to 10 wt % of heterocycle-containing acrylic monomer, 0.5 to 5 wt % of (meth)acrylic acid, 0.05 to 2 wt % of hydroxyalkyl (meth)acrylate, and 83 to 96.45 wt % of alkyl (meth)acrylate as monomer components. In the following description, the first laminate of the present invention, the second laminate of the present invention, and the third laminate of the present invention may be collectively referred to as "the laminate of the present invention".

The present invention also provides an optical member including: the laminate of the present invention.

The present invention also provides an optical apparatus including: the optical member according to the present invention.

Advantageous Effects of Invention

The present invention can provide a laminate of a void-containing layer and a pressure-sensitive adhesive/adhesive layer that achieves both a pressure-sensitive adhesive force or an adhesive force and a reduction of a tendency of a pressure-sensitive adhesive or an adhesive to penetrate into voids, and can also provide an optical member and an optical apparatus including the laminate.

DESCRIPTION OF EMBODIMENTS

Figure 1:
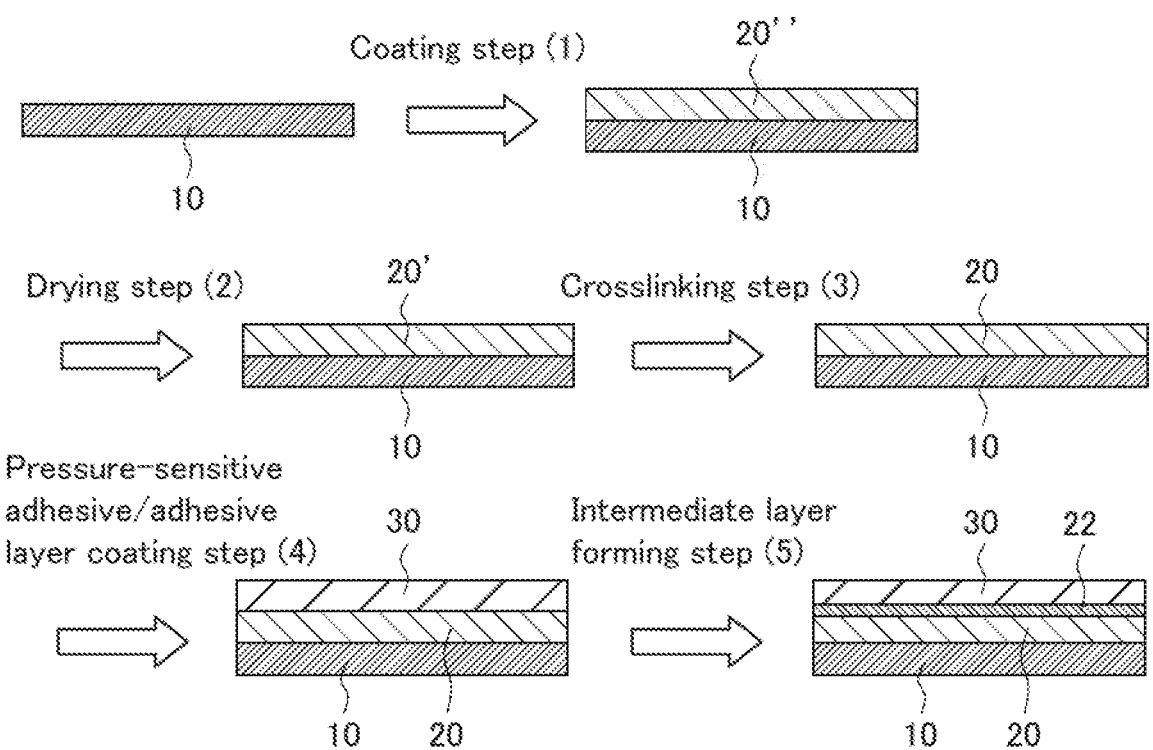
FIG. 1 is a cross-sectional view schematically illustrating an example of a process of a method for forming a laminate of the present invention in which a void-containing layer 20, an intermediate layer 22, and a pressure-sensitive adhesive/adhesive layer 30 are laminated on a resin base 10.

The present invention will be described more specifically below with reference to illustrative examples. It is to be noted, however, that the present invention is by no means limited by the following descriptions.

In the first laminate of the present invention, for example, the void remaining ratio of the void-containing layer after the heat/humidification durability test may be more than 50% and 99% or less of the void remaining ratio when only the void-containing layer is subjected to the heat/humidification durability test.

In the first laminate of the present invention, for example, the void-containing layer and the pressure-sensitive adhesive/adhesive layer may be laminated through an intermediate layer, the intermediate layer may be a layer formed by combining a part of the void-containing layer and a part of the pressure-sensitive adhesive/adhesive layer, the intermediate layer may have a thickness of 200 nm or less, and, after the heat/humidification durability test, an increasing rate of the thickness of the intermediate layer may be 500% or less with respect to the thickness of the intermediate layer before the heat/humidification durability test.

In the second laminate of the present invention, the numerical value of $[(100-X)/100] \times Y$ represented by the equation (I) is 10 or less, as described above. This means that the amount of component of the pressure-sensitive adhesive/adhesive layer penetrating into the void-containing layer is small. This allows the phenomena that the voids of the void-containing layer are filled and the void fraction is lowered can be suppressed or prevented. The gel fraction (X) of the pressure-sensitive adhesive is 70% or more as described above, and may be, for example, 75% or more or 80% or more. The upper limit of the gel fraction (X) is not particularly limited, and may be, for example, 100% or less, or 95% or less. The gel fraction (X) of the pressure-sensitive adhesive may be, for example, 75 to 95% or 80 to 95%. The thickness (Y) of the pressure-sensitive adhesive/adhesive layer is 2 to 50 μm as described above, and may be, for example, 5 μm or more or 10 μm or more, and may be, for example, 40 μm or less or 30 μm or less. The thickness (Y) of the pressure-sensitive adhesive/adhesive layer may be, for example, 5 to 40 μm or 10 to 30 μm.

The method of measuring the gel fraction (X) of the pressure-sensitive adhesive/adhesive layer is not particularly limited, and can be measured by, for example, the measurement method described in the Examples described below. The method of measuring the thickness (Y) of the pressure-sensitive adhesive/adhesive layer is not particularly limited, and can be measured by, for example, the measurement method described in the Examples described below.

In the second laminate of the present invention, by setting the gel fraction (X) of the pressure-sensitive adhesive/adhesive layer, the thickness (Y) of the pressure-sensitive adhesive/adhesive layer, and $[(100-X)/100] \times Y$ represented by the equation (I) within the above-mentioned specified ranges, it is possible to provide a laminate of a void-containing layer and a pressure-sensitive adhesive/adhesive layer that achieves both a pressure-sensitive adhesive force or an adhesive force and a reduction of a tendency of a pressure-sensitive adhesive or an adhesive to penetrate into voids, and to also provide an optical member and an optical device including the laminate.

In the second laminate of the present invention, for example, the weight-average molecular weight of the sol component of the pressure-sensitive adhesive/adhesive layer may be 50,000 to 500,000 in the molecular weight measurement of the pressure-sensitive adhesive/adhesive layer by gel permeation chromatography. Furthermore, the content of the low molecular weight component having a molecular weight of 10,000 or less in the sol component of the pressure-sensitive adhesive/adhesive layer may be 20 wt % (mass %) or less in the molecular weight measurement of the pressure-sensitive adhesive/adhesive layer by gel permeation chromatography, for example. By setting the weight-average molecular weight of the sol component or the content of the low molecular weight component having a molecular weight of 10,000 or less in the sol component within the above-mentioned specified ranges, a tendency of a pressure-sensitive adhesive or an adhesive to penetrate into voids is further reduced. The weight-average molecular weight of the sol component may be, for example, 70,000 or more, for example, 450,000 or less, or 400,000 or less, for example, 7 to 450,000 or 7 to 400,000. The content (proportion) of the component having a molecular weight of 10,000 or less in the sol component may be, for example, 20 wt % or less as described above, and may be, for example, 15 wt % or less or 10 wt % or less with respect to the total amount (100 wt %) of the sol component. The lower limit value of the content (proportion) of the component having a molecular weight of 10,000 or less in the sol component is not particularly limited, and may be, for example, 0 wt % or more or more than 0 wt %, and may be, for example, 3 wt % or more. The content (proportion) of the component having a molecular weight of 10,000 or less in the sol component may be, for example, 3 to 15 wt % or 3 to 10 wt %.

The specific measurement method by gel permeation chromatography is not particularly limited, and may be, for example, the measurement method described in the Examples described below.

In the second or third laminate of the present invention, for example, after the heat/humidification durability test of holding at a temperature of 85° C. and a relative humidity of 85% for 500 hours, the void remaining ratio of the void-containing layer may be 50 vol % or more of the void remaining ratio before the heat/humidification durability test. In addition, in the second or third laminate of the present invention, for example, the void remaining ratio of the void-containing layer after the heat/humidification durability test may be more than 50% and 99% or less of the void remaining ratio when only the void-containing layer is subjected to the heat/humidification durability test.

In the second or third laminate of the present invention, for example, the void-containing layer and the pressure-sensitive adhesive/adhesive layer may be laminated through an intermediate layer, the intermediate layer may be a layer formed by combining a part of the void-containing layer and a part of the pressure-sensitive adhesive/adhesive layer, and the intermediate layer may have a thickness of 200 nm or less.

In the second or third laminate of the present invention, for example, after the heat/humidification durability test of holding at a temperature of 85° C. and a relative humidity of 85% for 500 hours, an increasing rate of the thickness of the intermediate layer may be 500% or less with respect to the thickness of the intermediate layer before the heat/humidification durability test.

In the laminate of the present invention, for example, the void-containing layer may have a refractive index of 1.25 or less.

In the laminate of the present invention, for example, the pressure-sensitive adhesive/adhesive layer may be formed of an optical acrylic pressure-sensitive adhesive having a total light transmittance of 85% or more and a haze of 3% or less. Note that the total light transmittance and haze of the pressure-sensitive adhesive/adhesive layer can be measured by, for example, the same measurement method as that of the laminate or the void-containing layer described below.

In the laminate of the present invention, for example, the pressure-sensitive adhesive/adhesive layer may have a storage elastic modulus of $1.0 \times 10^5$ or more at 23° C. The method of measuring the storage elastic modulus at 23° C. is not particularly limited, and can be measured by, for example, the measurement method described in the Examples described below.

In the second or third laminate of the present invention, the pressure-sensitive adhesive/adhesive layer is formed of a pressure-sensitive adhesive containing a (meth)acrylic polymer and a crosslinking agent as described above. In the pressure-sensitive adhesive/adhesive layer, for example, the (meth)acrylic polymer may be crosslinked by the crosslinking agent to form a crosslinked structure.

The reason (mechanism) why the laminate of the present invention can achieve both a pressure-sensitive adhesive force or an adhesive force and a reduction of a tendency of a pressure-sensitive adhesive or an adhesive to penetrate into voids is considered as follows, for example. For example, by forming a pressure-sensitive adhesive/adhesive layer using a specific pressure-sensitive adhesive, the laminate can achieve both a pressure-sensitive adhesive force or an adhesive force and a reduction of a tendency of a pressure-sensitive adhesive or an adhesive to penetrate into voids. More specifically, for example, an intermediate layer is formed by combining a part of the void-containing layer and a part of the pressure-sensitive adhesive/adhesive layer by forming a pressure-sensitive adhesive/adhesive layer using a specific pressure-sensitive adhesive as described above. Use of the above-mentioned specific pressure-sensitive adhesive prevents the intermediate layer from excessively spread even under the condition such as the heat/humidification durability test. In addition, a reduction in void fraction due to filling of voids of the void-containing layer with the pressure-sensitive adhesive can be suppressed by the intermediate layer serving as a stopper. Even if the molecular motion of the pressure-sensitive adhesive increases under heating, if the elastic modulus of the pressure-sensitive adhesive is high, the intermediate layer formed of a pressure-sensitive adhesive and a high void-containing layer tends to serve as a strong and dense stopper, thereby suppressing penetration of a pressure-sensitive adhesive into a high void-containing layer. It is to be noted, however, that these mechanisms merely are examples and do not limit the present invention by any means.

[1. Laminate, Optical Member, and Optical Apparatus]

The laminate of the present invention includes a void-containing layer and a pressure-sensitive adhesive/adhesive layer, wherein the pressure-sensitive adhesive/adhesive layer is directly laminated on one or both sides of the void-containing layer, as described above. In the present invention, with reference to "the pressure-sensitive adhesive/adhesive layer is "directly laminated" on the void-containing layer", the pressure-sensitive adhesive/adhesive layer may be directly contacted with the void-containing layer, or the pressure-sensitive adhesive/adhesive layer may be laminated on the void-containing layer through the intermediate layer.

In the laminate of the present invention, after a heat/humidification durability test of holding at a temperature of 85° C. and a relative humidity of 85% for 500 hours, the void remaining ratio of the void-containing layer may be, for example, 50 vol % or more, 55 vol % or more, or 60 vol % or more with respect to the voids before the heat/humidification durability test, and the upper limit is not particularly limited, and is ideally 100 vol %, and may be 99 vol % or less, 98 vol % or less, or 95 vol % or less.

When the laminate of the present invention includes the intermediate layer, as described above, after a heat/humidification durability test of holding at a temperature of 85° C. and a relative humidity of 85% for 500 hours, the increasing rate of the thickness of the intermediate layer may be 500% or less with respect to the thickness of the intermediate layer before the heat/humidification durability test with the thickness of the intermediate layer before the heat/humidification durability test being considered as 100%, for example. The increasing rate of the thickness of the intermediate layer after the heat/humidification durability test may be, for example, 400% or less, 350% or less, or 300% or less, and may be, for example, 100% or more, 110% or more, 120% or more, 130% or more, or 140% or more with respect to the thickness of the intermediate layer before the heat/humidification durability test with the thickness of the intermediate layer before the heat/humidification durability test being considered as 100%.

Furthermore, in the laminate of the present invention, the void remaining ratio of the void-containing layer after the heat/humidification durability test may be, for example, more than 50% and 99% or less of the void remaining ratio in the case where only the void-containing layer is subjected to the heat/humidification durability test as described above, and the void remaining ratio may be 53% or more, 55% or more, or 60% or more, and 98% or less, 97% or less, or 96% or less.

In the laminate of the present invention, for example, the light transmittance of the laminate of the pressure-sensitive adhesive/adhesive layer and the void-containing layer or the laminate of the pressure-sensitive adhesive/adhesive layer, the intermediate layer, and the void-containing layer may be 80% or more. The haze of the laminate may be 3% or less, for example. The light transmittance may be, for example, 82% or more, 84% or more, 86% or more, or 88% or more, and the upper limit is not particularly limited, and is ideally 100%, and may be, for example, 95% or less, 92% or less, 91% or less, or 90% or less. The haze of the laminate can be measured, for example, in the same manner as measuring the haze of the void-containing layer described below. The light transmittance is a transmittance of light having a wavelength of 550 nm, and can be measured by, for example, the following measurement method.

(Measurement Method of Light Transmittance)

A spectrophotometer U-4100 (trade name, manufactured by Hitachi, Ltd.) is used, and the laminate is used as a sample to be measured. The total light transmittance (light transmittance) of the sample is measured with the total light transmittance of air being considered to be 100%. The value of the total light transmittance (light transmittance) is a value measured at a wavelength of 550 nm.

In the laminate of the present invention, for example, the pressure-sensitive adhesive/adhesive layer may have a pressure-sensitive adhesive force or an adhesive force of 0.7N/25 mm or more, 0.8N/25 mm or more, 1.0N/25 mm or more, or 1.5N/25 mm or more, and 50N/25 mm or less, 30N/25 mm or less, 10N/25 mm or less, 5N/25 mm or less, or 3N/25 mm or less. From the viewpoint of risks of peeling off at the time of handling when the laminate is adhered to other layers, it is preferable that the pressure-sensitive adhesive force or the adhesive force of the pressure-sensitive adhesive/adhesive layer be not too low. In addition, from the viewpoint of rework at the time of reattachment, it is preferable that the pressure-sensitive adhesive force or the adhesive force of the pressure-sensitive adhesive/adhesive layer be not too high. The pressure-sensitive adhesive force or the adhesive force of the pressure-sensitive adhesive/adhesive layer can be measured, for example, as follows.

(Measurement Method of Pressure-Sensitive Adhesive Force or Adhesive Force)

From the laminated film of the present invention (film in which the laminate of the present invention is formed on a resin film base), a strip-shaped piece with a size of 50 mm×40 mm is obtained as a sample, and the sample is fixed to a stainless plate with a double-sided tape. An acrylic pressure-sensitive adhesive layer (thickness: 20 μm) is adhered to a PET film (T100: manufactured by Mitsubishi Plastics, Inc.), and the thus-obtained adhesive tape is cut into a piece with a size of 25 mm×100 mm. The thus-obtained cut piece is adhered to the opposite side of the resin film in the laminated film of the present invention to form a laminate of the PET film and the laminated film. Then, the sample is chucked in an autograft tensile testing machine (AG-Xplus, manufactured by Shimadzu Corporation) with a distance between chucks being 100 mm, and the tensile test is performed at a tensile speed of 0.3 m/min. The mean value of the peel test data for 50 mm is set as the peel adhesion strength, i.e., pressure-sensitive adhesive force. The adhesive force can also be measured by the same measurement method. In the present invention, there is no clear distinction between the "pressure-sensitive adhesive force" and the "adhesive force".

The laminate of the present invention may be formed on a base such as, for example, a film. The film may be, for example, a resin film. Regarding the "film" and the "sheet", generally, the one having a relatively small thickness is called a "film" and the one having a relatively large thickness is called a "sheet" in some cases, however, in the present invention, there is no particular distinction between the "film" and the "sheet".

The base is not limited to particular bases, and for example, a base made of a thermoplastic resin, a base made of glass, an inorganic base plate typified by silicon, a plastic formed of a thermosetting resin, an element such as a semiconductor, or a carbon fiber-based material typified by carbon nanotube can be favorably used. The base, however, is by no means limited thereto. Examples of the form of the base include a film and a plate. Examples of the thermoplastic resin include polyethylene terephthalate (PET), acrylic resins, cellulose acetate propionate (CAP), cycloolefin polymer (COP), triacetylcellulose (TAC), polyethylene naphthalate (PEN), polyethylene (PE), and polypropylene (PP).

The optical member of the present invention is not particularly limited, and may be, for example, an optical film including the laminate of the present invention.

The optical apparatus (optical device) of the present invention is not particularly limited, and may be, for example, an image display device, an illumination device, or the like. Examples of the image display device include a liquid crystal display, an organic electro luminescence (EL) display, and a micro light emitting diode (LED) display. The illumination device may be, for example, an organic EL illumination, or the like.

[2. Void-Containing Layer]

The void-containing layer in the laminate of the present invention (hereinafter also referred to as the "void-containing layer of the present invention") will be described below with reference to examples. It is to be noted, however, that the void-containing layer of the present invention is not limited thereto.

The void-containing layer of the present invention may have, for example, a void fraction of 35 vol % or more and a peak pore diameter of 50 nm or less. However, this merely is an example, and the void-containing layer of the present invention is not limited thereto.

The void fraction may be, for example, 35 vol % or more, 38 vol % or more, or 40 vol % or more, and 90 vol % or less, 80 vol % or less, or 75 vol % or less. The void-containing layer of the present invention may be, for example, a highly void-containing layer having a void fraction of 60 vol % or more.

The void fraction can be measured, for example, by the following measurement method.

(Measurement Method of Void Fraction)

If the layer whose void fraction is to be measured is a single layer containing voids, the ratio (volume ratio) between the component of the layer and the air can be calculated by a standard method (for example, weight and volume are measured to calculate the density), whereby the void fraction (vol %) can be calculated. Further, since the refractive index and the void fraction have a correlation, the void fraction can be calculated from the value of the refractive index as a layer, for example. Specifically, for example, the void fraction is calculated according to the Lorentz-Lorenz's formula from the value of the refractive index measured by an ellipsometer.

The void-containing layer of the present invention can be produced, for example, by chemical bonding of gel pulverized products (microporous particles) as will be described below. In this case, the voids of the void-containing layer can be divided into three types (1) to (3) below for convenience.

(1) Voids contained in raw material gel itself (inside the particles)

(2) Voids contained in gel pulverized product unit (3) Voids between gel pulverized products created by deposition of gel pulverized products The voids (2) are voids formed during pulverization, which are different from the voids (1) that can be formed in each block when each particle group generated by pulverizing the gel is regarded as one mass (block) regardless of the size or the like of the gel pulverized product (microporous particle). The voids (3) are voids created because of irregularity in the sizes or the like of the gel pulverized products (microporous particles) in pulverization (e.g., media-less pulverization). The void-containing layer of the present invention contains the voids (1) to (3), whereby an appropriate void fraction and peak pore diameter can be achieved, for example.

The peak pore diameter may be, for example, 5 nm or more, 10 nm or more, or 20 nm or more, and 50 nm or less, 40 nm or less, or 30 nm or less. In the void-containing layer, if the peak pore diameter is too large in a state where the void fraction is high, light is scattered, which makes the void-containing layer opaque. Further, in the present invention, the lower limit value of the peak pore diameter of the void-containing layer is not particularly limited, but it is preferable that the peak pore diameter is not too small because it is difficult to increase the void fraction if the peak pore diameter be too small. In the present invention, the peak pore diameter can be measured, for example, by the following method.

(Measurement Method of Peak Pore Diameter)

The peak pore diameter is calculated from the results of the BJH plot and the BET plot by nitrogen adsorption and the isothermal adsorption line using a pore distribution/specific surface area analyzer (trade name: BELLSORP MINI, MicrotracBEL Corp.).

The thickness of the void-containing layer of the present invention is not particularly limited, and may be, for example, 100 nm or more, 200 nm or more, or 300 nm or more, and 10000 nm or less, 5000 nm or less, or 2000 nm or less.

The void-containing layer of the present invention uses pulverized products of the porous gel material, for example. Thus, the three-dimensional structure of the porous gel material is destroyed, whereby a new three-dimensional structure different from that of the porous gel material is formed. As will be described below, the void-containing layer of the present invention becomes a layer having a new pore structure (new void-containing structure) that cannot be obtained in a layer formed using the porous gel material. That is, a nano-scale void-containing layer having a high void fraction can be formed. Moreover, for example, when the void-containing layer of the present invention is a silicone porous material, the pulverized products in the void-containing layer are chemically bonded to each other while adjusting the number of functional groups having siloxane bonds of the silicon compound gel, for example. Furthermore, a new three-dimensional structure is formed as a void-containing layer precursor, and pulverized products are thereafter bonded chemically (e.g., crosslinked) to each other in the bonding step. Thus, when the void-containing layer of the present invention is a void-containing layer, the void-containing layer has a structure with void spaces, for example. However, it can maintain a sufficient strength and sufficient flexibility. Therefore, according to the present invention, the void-containing layer can be easily and simply applied to various objects.

For example, the void-containing layer of the present invention includes pulverized products of a porous gel material as will be described below, and the pulverized products are chemically bonded to each other. In the void-containing layer of the present invention, the form of the chemical bonding (chemical bonds) between the pulverized products is not limited to particular forms. Specifically, the chemical bonds may be crosslinking bonds, for example. The method for chemically bonding the pulverized products to each other is as described in detail in, for example, the method for producing the void-containing layer described above.

The crosslinking bonds are siloxane bonds, for example. Examples of the siloxane bonds include T2, T3, and T4 bonds shown below. When the silicone porous material of the present invention includes siloxane bonds, the silicone porous material may include any one of the T2, T3, and T4 bonds, any two of them, or all three of them, for example. As the proportions of T2 and T3 among the siloxane bonds become higher, the silicone porous material becomes more flexible, so that it is expected that the silicone porous material exhibits characteristics intrinsic to the gel. However, the film strength of the silicone porous material is deteriorated. When the proportion of T4 in the siloxane bonds becomes higher, a film strength is more likely to be obtained, whereas void spaces become smaller, resulting in deteriorated flexibility. Thus, it is preferable to adjust the proportions of T2, T3, and T4 depending on the intended use of the silicone porous material, for example.

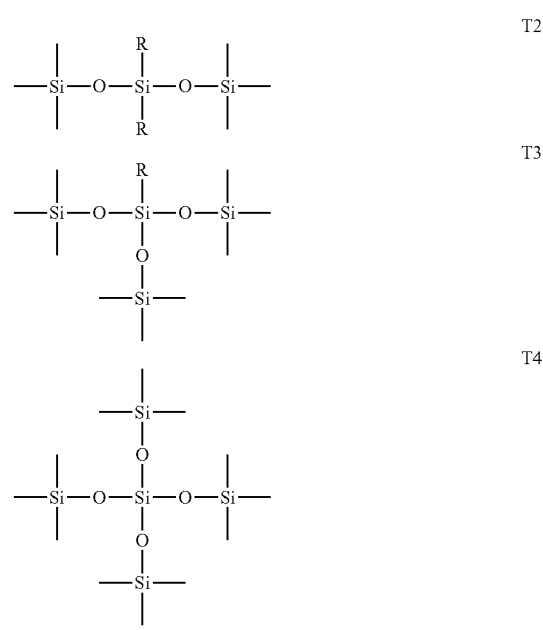

In the case where the void-containing layer of the present invention includes the siloxane bonds, the ratio of T2, T3, and T4 expressed relatively assuming that the proportion of T2 is "1" is as follows, for example: T2:T3:T4=1:[1 to 100]:[0 to 50], 1:[1 to 80]:[1 to 40], or 1:[5 to 60]:[1 to 30].

It is preferable that silicon atoms contained in the void-containing layer of the present invention be bonded to each other through siloxane bonds, for example. As a specific example, the proportion of unbonded silicon atoms (i.e., residual silanol) among all the silicon atoms contained in the silicone porous material is less than 50%, 30% or less, or 15% or less, for example.

The void-containing layer of the present invention has a pore structure. In the present invention, the size of each void space in the pore structure indicates, out of the diameter of the long axis and the diameter of the short axis of the void space (pore), the diameter of the long axis. The size of the void space (pore) is from 5 nm to 50 nm, for example. The lower limit of the size is, for example, 5 nm or more, 10 nm or more, or 20 nm or more. The upper limit of the size is, for example, 50 nm or less, 40 nm or less, or 30 nm or less. The range of the size is, for example, from 5 nm to 50 nm or from 10 nm to 40 nm. A preferable size of the void spaces is determined depending on the use of the void-containing structure. Thus, it is necessary to adjust the size of the void spaces to a desired value according to the intended use, for example. The size of the void spaces can be evaluated in the following manner, for example.

(SEM Observation of Cross Section of Void-Containing Layer)

In the present invention, the void-containing layer can be observed and analyzed using a scanning electron microscopy (SEM). Specifically, for example, the void-containing layer is subjected to FIB processing (acceleration voltage: 30 kV) while being cooled, and the cross-sectional electronic image of the obtained cross-sectional sample can be obtained by FIB-SEM (trade name: Helios NanoLab 600, manufactured by FEI Company, acceleration voltage: 1 kV) at an observing magnification of 100,000×.

(Evaluation of Size of Void Spaces)

In the present invention, the size of the void spaces can be quantified according to the BET test. Specifically, 0.1 g of a sample (the void-containing layer of the present invention) is set in a capillary tube of a pore distribution/surface area measurement apparatus (trade name: BELLSORP MIN, manufactured by MicrotracBEL Corp.), and dried under reduced pressure at room temperature for 24 hours to remove gas in the void-containing structure. Then, a BET plot, a BJH plot, and an adsorption isotherm are created by causing the sample to adsorb nitrogen gas, whereby the pore distribution is determined. On the basis of the thus-determined pore distribution, the size of the void spaces can be evaluated.

The void-containing layer of the present invention may have, for example, a pore structure (porous structure) as mentioned above, and the pore structure may be an open-cell structure in which pores are interconnected with each other, for example. The open-cell structure means that, for example, in the low refractive index layer, pores three-dimensionally communicate with each other. In other words, the open-cell structure means the state where void spaces inside the pore structure are interconnected with each other. When a porous material has an open-cell structure, this structure allows the bulk body to have a higher void fraction. However, in the case where closed-cell particles such as hollow silica particles are used, an open-cell structure cannot be formed. In contrast, in the void-containing layer of the present invention, an open-cell structure can be formed easily for the following reason. Sol particles (pulverized products of a porous gel material for forming a sol) each have a dendritic structure, so that the open-cell structure is formed as a result of sedimentation and deposition of the dendritic particles in a coating film (a coating film formed of a sol containing pulverized products of the porous gel material). Further, it is more preferable that the void-containing layer of the present invention form a monolith structure, which is an open-cell structure including two or more types of micropore distributions. The monolith structure refers to a layered structure including a structure in which nano-sized void spaces are present and an open-cell structure formed by aggregation of the nano-sized spaces, for example. When the monolith structure is formed, for example, the film strength is imparted by the minute void spaces whereas a high void fraction is achieved by the presence of the void spaces forming a bulky open-cell structure. Thus, both a film strength and a high void fraction can be attained. In order to form such a monolith structure, for example, first, in the porous gel material before being pulverized into the pulverized products, it is preferable to control the micropore distributions in a void-containing structure to be generated. Also, the monolith structure can be formed by, for example, controlling, at the time of pulverizing the porous gel material, the particle sizes of the pulverized products so that a desired particle size distribution can be obtained.

In the void-containing layer of the present invention, the haze value indicating the transparency is not particularly limited. The lower limit of the haze is, for example, 0.1% or more, 0.2% or more, or 0.3% or more. The upper limit of the haze is, for example, 10% or less, 5% or less, or 3% or less. The range of the haze value is, for example, from 0.1% to 10%, from 0.2% to 5%, or from 0.3% to 3%.

The haze value can be measured in the following manner, for example.

(Evaluation of Haze Value)

A void-containing layer (the void-containing layer of the present invention) is cut into a piece with a size of 50 mm×50 mm, and the thus-obtained cut piece is set in a haze meter (HM-150, manufactured by Murakami Color Research Laboratory) to measure the haze value. The haze value is calculated by the following formula.

Haze value (%)=[diffuse transmittance (%)/total light transmittance (%)]×100(%)

The "refractive index" of a given medium generally refers to the ratio of transmission speed of the wavefront of light in vacuum to the phase velocity of the light in the medium. The refractive index of the void-containing layer of the present invention is not particularly limited, and the upper limit thereof is, for example, 1.3 or less, less than 1.3, 1.25 or less, 1.2 or less, or 1.15 or less, the lower limit thereof is, for example, 1.05 or more, 1.06 or more, or 1.07 or more, and the range thereof is, for example, 1.05 or more and 1.3 or less, 1.05 or more and less than 1.3, 1.05 or more and 1.25 or less, 1.06 or more and less than 1.2, or 1.07 or more and 1.15 or less.

In the present invention, the refractive index refers to the one measured at a wavelength of 550 nm, unless otherwise stated. The method for measuring the refractive index is not particularly limited. For example, the refractive index can be measured in the following manner.

(Evaluation of Refractive Index)

A void-containing layer (the void-containing layer of the present invention) is formed on an acrylic film, and the obtained laminate is then cut into a piece with a size of 50 mm×50 mm. The thus-obtained cut piece is adhered onto a surface of a glass plate (thickness: 3 mm) with a pressure-sensitive adhesive layer. The central portion (diameter: about 20 mm) of the back surface of the glass plate is painted entirely with black ink, thereby preparing a sample that allows no reflection at the back surface of the glass plate. The sample is set in an ellipsometer (VASE, manufactured by J. A. Woollam Japan), and the refractive index is measured at a wavelength of 500 nm and at an incidence angle of 50° to 80°. The mean value of the thus-obtained measured values is set as the refractive index.

The thickness of the void-containing layer of the present invention is not particularly limited, and the lower limit thereof is, for example, 0.05 μm or more or 0.1 μm or more, and the upper limit thereof is, for example, 1000 μm or less or 100 μm or less, and the range thereof is, for example, from 0.05 to 1000 μm or 0.1 to 100 μm.

The form of the void-containing layer of the present invention is not particularly limited, and may be, for example, in the form of a film, a block, or the like.

The method for producing the void-containing layer of the present invention is not particularly limited, and can be produced by, for example, the method as will be described below.

[3. Pressure-Sensitive Adhesive]

In the laminate of the present invention, the pressure-sensitive adhesive/adhesive layer can be formed using, for example, at least one of pressure-sensitive adhesive and adhesive. In the present invention, the "pressure-sensitive adhesive" and the "adhesive" are not always clearly distinguishable from each other as will be described below. The pressure-sensitive adhesive is not particularly limited, and examples thereof include the pressure-sensitive adhesives below.

The pressure-sensitive adhesive used for forming the pressure-sensitive adhesive layer in the laminate of the present invention employs, as a base polymer, a (meth) acrylic polymer including 3 to 10 wt % of heterocycle-containing acrylic monomer having a polymerizable functional group, 0.5 to 5 wt % of (meth)acrylic acid, 0.05 to 2 wt % of hydroxyalkyl (meth)acrylate, and 83 to 96.45 wt % of alkyl (meth)acrylate as monomer components, for example.

As the heterocycle-containing acrylic monomer, for example, one having a polymerizable functional group and a heterocycle can be used without any particular limitation. Examples of the polymerizable functional group include a (meth)acryloyl group and a vinyl ether group. Among these, the (meth)acryloyl group is preferable. Examples of the heterocycle include morpholine rings, piperidine rings, pyrrolidine rings, and piperazine rings. Examples of the heterocycle-containing acrylic monomer include N-acryloyl morpholine, N-acryloyl piperidine, N-methacryloyl piperidine, and N-acryloyl pyrrolidine. Among these, N-acryloyl morpholine is preferable. Note that the heterocycle-containing acrylic monomer can improve the durability of either heat resistance or moisture resistance when the pressure-sensitive adhesive layer is thinned.

The heterocycle-containing acrylic monomer is preferable in that it can improve the pressure-sensitive adhesive force of a pressure-sensitive adhesive layer to the optical film. In particular, the heterocycle-containing acrylic monomer is preferable in that it improves the pressure-sensitive adhesive force to cyclic polyolefin such as a norbornene resin, and it is suitable for the case in which the cyclic polyolefin is used as the optical film.

The heterocycle-containing acrylic monomer is used, for example, in a proportion of 3 to 10 wt % with respect to the total amount of the monomer component forming the (meth) acrylic polymer. The proportion of the heterocycle-containing acrylic monomer may be, for example, 4 to 9.5 wt % or 6 to 9 wt %. The proportion of the heterocycle-containing acrylic monomer is preferably not less than the above-mentioned range from the viewpoint of heat resistance and moisture resistance when the pressure-sensitive adhesive layer is thinned. In addition, the proportion of the heterocycle-containing acrylic monomer is preferably not greater than the above-mentioned range from the viewpoint of the moisture resistance when the pressure-sensitive adhesive layer is thinned. Further, the proportion of the heterocycle-containing acrylic monomer is preferably not greater than the above-mentioned range from the viewpoint of improving the adherence of the pressure-sensitive adhesive layer. Furthermore, the proportion of the heterocycle-containing acrylic monomer is preferably not greater than the above-mentioned range from the viewpoint of the pressure-sensitive adhesive force.

As the (meth)acrylic acid, acrylic acid is particularly preferable.

The (meth)acrylic acid is used, for example, in a proportion of 0.5 to 5 wt % with respect to the total amount of the monomer component forming the (meth)acrylic polymer. The proportion of (meth)acrylic acid may be, for example, 1 to 4.5 wt % or 1.5 to 4 wt %. The proportion of (meth)acrylic acid is preferably not less than the above-mentioned range from the viewpoint of heat resistance when the pressure-sensitive adhesive layer (pressure-sensitive adhesive/adhesive layer) is thinned. In addition, the proportion of (meth)acrylic acid is preferably not greater than the above-mentioned range from the viewpoint of heat resistance and moisture resistance when the pressure-sensitive adhesive layer is thinned. Furthermore, the proportion of (meth)acrylic acid is preferably not greater than the above-mentioned range from the viewpoint of the pressure-sensitive adhesive force.

As the hydroxyalkyl (meth)acrylate, for example, one having a polymerizable functional group and a hydroxyl group can be used without any particular limitation. Preferable examples of suitable hydroxyalkyl (meth)acrylate include 2-hydroxyethyl (meth)acrylate, 2-hydroxybutyl (meth)acrylate, 3-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth) acrylate, and 12-hydroxylauryl (meth)acrylate.

The hydroxyalkyl (meth)acrylate is used, for example, in a proportion of 0.05 to 2 wt % with respect to the total amount of the monomer component forming the (meth) acrylic polymer. The proportion of hydroxyalkyl (meth) acrylate may be, for example, 0.075 to 1.5 wt % or 0.1 to 1 wt %. The proportion of the hydroxyalkyl (meth)acrylate is preferably not less than the above-mentioned range from the viewpoint of heat resistance when the pressure-sensitive adhesive layer (pressure-sensitive adhesive/adhesive layer) is thinned. Further, the proportion of hydroxyalkyl (meth) acrylate is preferably not greater than the above-mentioned range from the viewpoint of heat resistance and moisture resistance when the pressure-sensitive adhesive layer is thinned. Furthermore, the proportion of the hydroxyalkyl (meth)acrylate is preferably not greater than the above-mentioned range from the viewpoint of the pressure-sensitive adhesive force.

The alkyl (meth)acrylate may be, for example, the one in which an average carbon number of an alkyl group is about 1 to 12. Note that (meth)acrylate refers to acrylate and/or methacrylate, and has the same meaning as (meth) in the present invention. Specific examples of alkyl (meth)acrylate include methyl (meth)acrylate, ethyl (meth)acrylate, n-butyl (meth)acrylate, 2-ethylhexyl (meth)acrylate, isooctyl (meth) acrylate, isononyl (meth)acrylate, and lauryl (meth)acrylate, which can be used alone or in combination. Among these, alkyl (meth)acrylate in which the number of carbon atoms of an alkyl group is 1 to 9 is preferable.

The alkyl (meth)acrylate is used, for example, in a proportion of 83 to 96.45 wt % with respect to the total amount of the monomer component forming the (meth)acrylic polymer. The alkyl (meth)acrylate is usually the remainder other than the heterocycle-containing acrylic monomer, (meth)acrylic acid, and hydroxyalkyl (meth)acrylate.

As the monomer component forming the (meth)acrylic polymer, for example, in addition to the above-mentioned monomers, any monomer other than the above-mentioned monomers can be used in a proportion of 10% or less with respect to the total amount of the monomer within a range that does not impair the object of the present invention.

Examples of the monomer other than the above-mentioned monomers include acid anhydride group-containing monomers such as maleic anhydride and itaconic anhydride; caprolactone adducts of acrylic acid; sulfonic acid group-containing monomers such as styrene sulfonic acid and allylsulfonic acid, 2-(meth)acrylamide-2-methylpropane-sulfonic acid, (meth)acrylamidopropanesulfonic acid, sulfopropyl(meth)acrylate, and (meth)acryloyloxynaphthalene-sulfonic acid; and phosphoric acid group-containing monomer such as 2-hydroxyethylacryloylphosphate. Nitrogen-containing vinyl monomers can be also used. Examples of the nitrogen-containing vinyl monomer include maleimide, N-cyclohexylmaleimide, N-phenylmaleimide; (meth)acrylamide, N, N-dimethyl (meth) acrylamide, N, N-diethyl (meth) acrylamide, N-hexyl (meth) acrylamide, (N-substituted) amide monomers such as N-methyl (meth) acrylamide, N-butyl (meth) acrylamide, N-butyl (meth) acrylamide, N-methylol (meth) acrylamide, N-methylolpropane (meth) acrylamide; (meth) acrylic acid acrylate alkylaminoalkyl monomers such as aminoethyl (meth) acrylate, aminopropyl (meth) acrylate, N, N-dimethylaminoethyl (meth) acrylate, t-butylaminoethyl (meth) acrylate, 3-(3-pyridinyl) propyl (meth) acrylate; alkoxyalkyl (meth) acrylate monomers such as methoxyethyl (meth) acrylate and ethoxyethyl (meth) acrylate; succinimide monomers such as N-(meth) acryloyloxymethylene succinimide and N-(meth) acryloyl-6-oxyhexamethylene succinimide and N-(meth) acryloyl-8-oxyoctamethylene succinimide.

In addition, vinyl monomers such as vinyl acetate, vinyl propionate, N-vinyl pyrrolidone, methyl vinyl pyrrolidone, vinyl pyridine, vinyl piperidone, vinyl pyrimidine, vinyl piperazine, vinyl pyrazine, vinyl pyrrole, vinyl imidazole, vinyl oxazole, vinyl morpholine, N-vinyl carboxylic acid amides, styrene, α-methylstyrene and N-vinylcaprolactam; cyanoacrylate monomers such as acrylonitrile and methacrylonitrile; epoxy group-containing acrylic monomers such as glycidyl (meth) acrylate; glycol acrylic ester monomers such as polyethylene (meth) acrylate glycol, polypropylene glycol (meth) acrylate, methoxyethylene glycol (meth) acrylate, methoxypolypropylene glycol (meth) acrylate; acrylic acid ester monomers such as (meth) acrylic acid tetrahydrofurfuryl, fluorine (meth) acrylate, also as silicone (meth) acrylate and 2-methoxyethyl acrylate can be used.

Furthermore, examples of the copolymerizable monomers other than the above-mentioned monomers include silane monomers containing a silicon atom. Examples of the silane monomer include 3-acryloxypropyltriethoxysilane, vinyltrimethoxysilane, vinyltriethoxysilane, 4-vinylbutyltrimethoxysilane, 4-vinylbutyltriethoxysilane, and 8-vinyloctyltrimethoxysilane, 8-vinyloctyltriethoxysilane, 10-methacryloyloxydecyltrimethoxysilane, 10-acryloyloxydecyltrimethoxysilane, 10-methacryloyloxydecyltriethoxysilane, and 10-acryloyloxydecyltriethoxysilane.

The (meth)acrylic polymer used in the present invention may have, for example, a weight-average molecular weight of 1,500,000 to 2,800,000. The weight-average molecular weight may be, for example, 1,700,000 to 2,700,000 or 2,000,000 to 2,500,000. The weight-average molecular weight is preferably not less than the above-mentioned range from the viewpoint of heat resistance and moisture resistance. In addition, the weight-average molecular weight is preferably not greater than the above-mentioned range from the viewpoint of the durability, the adherence, and the pressure-sensitive adhesive force when the pressure-sensitive adhesive layer is thinned. In the present invention, the weight-average molecular weight is, for example, a value measured by gel permeation chromatography (GPC) and calculated by polystyrene conversion.

The method for producing such a (meth)acrylic polymer is not particularly limited, and for example, known methods such as solution polymerization, bulk polymerization, emulsion polymerization, or various radical polymerization can be appropriately selected. The (meth)acrylic polymer to be obtained may be any of a random copolymer, a block copolymer, and a graft copolymer.

In the solution polymerization, for example, ethyl acetate, toluene, or the like is used as a polymerization solvent. As a specific example of the solution polymerization, a polymerization initiator is added under a stream of an inert gas such as nitrogen, and the reaction is performed, for example, at about 50 to 70° C. for about 5 to 30 hours.

The polymerization initiator, the chain transfer agent, the emulsifier, and the like used for the radical polymerization are not particularly limited and can be appropriately selected and used. The weight-average molecular weight of the (meth)acrylic polymer can be controlled by the amounts of the polymerization initiator and the chain transfer agent, and the reaction conditions, and the amount of the (meth)acrylic polymer is appropriately adjusted according to the types of the polymerization initiator, the chain transfer agent, and the like.

Examples of the polymerization initiator include azo-initiators such as 2,2'-azobisisobutyronitrile, 2,2'-azobis (2-amidinopropane) dihydrochloride, 2,2'-azobis [2-(5-methyl-2-imidazolin-2-yl) propane]dihydrochloride, 2,2'-azobis (2-methylpropionamidine) disulfate, 2,2'-azobis (N, N'-dimethyleneisobutylamidine), 2,2'-azobis [N-(2-Carboxyethyl)-2-methylpropionamidine]hydrate (VA-057, manufactured by Wako Pure Chemical Industries, Ltd.), persulfates such as potassium persulfate and ammonium persulfate; peroxide-based initiators such as di (2-ethylhexyl) par oxydicarbonate, di (4-t-butylcyclohexyl) peroxydicarbonate, di-sec-butylperoxydicarbonate, t-butyl peroxy neodecanoate, t-hexyl peroxy pivalate, t-butyl peroxy pivalate, dilauroyl peroxide, di-n-octanoyl peroxide, 1,1,3,3-tetramethyl butyl peroxide Oxy-2-ethylhexanoate, di (4-methylbenzoyl) peroxide, dibenzoyl peroxide, t-butylperoxyisobutyrate, 1,1-di (t-hexylperoxy) cyclohexane, t-butylhydro peroxides and hydrogen peroxide, and redox initiators obtained by combination of a peroxide and a reducing agent such as the combination of persulfate and sodium bisulfate or the combination of peroxide and sodium ascorbate.

The polymerization initiator may be used alone, or two or more of them may be used in combination. The content of the polymerization initiator as a whole may be, for example, about 0.005 to 1 parts by weight or about 0.02 to 0.5 parts by weight with respect to 100 parts by weight of the monomer.

For producing the (meth)acrylic polymer having the above-mentioned weight-average molecular weight by using 2,2'-azobisisobutyronitrile as the polymerization initiator, for example, the amount of the polymerization initiator may be, for example, about 0.06 to 0.2 parts by weight or about 0.08 to 0.175 parts by weight with respect to 100 parts by weight of the total weight of the monomer component.

Examples of the chain transfer agent include lauryl mercaptan, glycidyl mercaptan, mercaptoacetic acid, 2-mercaptoethanol, thioglycolic acid, 2-ethylhexyl thioglycolate, and 2,3-dimercapto-1-propanol. The chain transfer agent may be used alone or two or more of them may be used in combination. The content of the chain transfer agent as a whole is, for example, about 0.1 parts by weight or less with respect to 100 parts by weight of the total amount of the monomer component.

Examples of emulsifiers used in emulsion polymerization include anionic emulsifiers such as sodium lauryl sulfate, ammonium lauryl sulfate, sodium dodecyl benzene sulfonate, ammonium polyoxyethylene alkyl ether sulfate, sodium polyoxyethylene alkyl phenyl ether sulfate, and nonionic emulsifiers such as polyoxyethylene alkyl ether, polyoxyethylene alkyl phenyl ether, polyoxyethylene fatty acid ester, and polyoxyethylene-polyoxypropylene block polymer. These emulsifiers may be used alone or two or more of them may be used in combination.

Further, a reactive emulsifier may be an emulsifier to which a radically polymerizable functional group such as a propenyl group or an allyl ether group is introduced, and specific examples thereof include Aqualon HS-10, HS-20, KH-10, BC-05, BC-10, and BC-20 (all of which are manufactured by DKS Co., Ltd.), and ADEKA REASOAP SE10N (manufactured by Asahi Denko Co., Ltd.). The reactive emulsifier is incorporated into the polymer chain after polymerization so that it is preferable in view of improving water resistance. The amount of the emulsifier is preferably 0.3 to 5 parts by weight, and more preferably 0.5 to 1 parts by weight with respect to 100 parts by weight of the total amount of the monomer component from the viewpoint of polymerization stability and mechanical stability.

The pressure-sensitive adhesive is preferably a pressure-sensitive adhesive composition that contains a crosslinking agent. Examples of the polyfunctional compound which can be incorporated into the pressure-sensitive adhesive include an organic crosslinking agent and a polyfunctional metallic chelate. Examples of the organic crosslinking agent include an epoxy crosslinking agent, an isocyanate crosslinking agent, and an imine crosslinking agent. As the organic crosslinking agent, the isocyanate crosslinking agent is preferable. The polyfunctional metal chelate is one in which a polyvalent metal is covalently or coordinatively bonded to an organic compound. Examples of the polyvalent metal atom include Al, Cr, Zr, Co, Cu, Fe, Ni, V, Zn, In, Ca, Mg, Mn, Y, Ce, Sr, Ba, Mo, La, Sn, and Ti. The atom in the organic compound to which polyvalent metal is covalently or coordinatively bonded may be an oxygen atom, and examples of the organic compound include an alkyl ester, an alcohol compound, a carboxylic acid compound, an ether compound, and a ketone compound.

Examples of the isocyanate crosslinking agent include aromatic isocyanates such as trilene diisocyanate and xylene diisocyanate; alicyclic isocyanate such as isophorone diisocyanate; and aliphatic isocyanate such as hexamethylene diisocyanate.

More specific examples of the isocyanate crosslinking agent include lower aliphatic polyisocyanates such as butylene diisocyanate and hexamethylene diisocyanate; alicyclic isocyanates such as cyclopentylene diisocyanate, cyclohexylene diisocyanate and isophorone diisocyanate; aromatic diisocyanates such as 2,4-trilene diisocyanate, 4,4'-diphenylmethane diisocyanate, xylylene diisocyanate, and polymethylene polyisocyanate; isocyanate adducts such as trimethylolpropane/tolylene diisocyanate trimer adduct (manufactured by Nippon Polyurethane Industry Co., Ltd.; trade name: Coronate L); trimethylolpropane/hexamethylene diisocyanate trimer adduct (manufactured by Nippon Polyurethane Industry Co., Ltd.; trade name: Coronate HL), and isocyanurate form of hexamethylene diisocyanate (manufactured by Nippon Polyurethane Industry Co., Ltd.; trade name Coronate HX), polyether polyisocyanates, polyester polyisocyanates, and adducts of these and various polyols, polyisocyanates polyfunctionalized with isocyanurate linkages, burette linkages, allophanate linkages, and the like.

The isocyanate crosslinking agent may be used alone or two or more of them may be used in combination. The content of isocyanate crosslinking agent as a whole may be, for example, 0.02 to 2 parts by mass, 0.04 to 1.5 parts by mass, or 0.05 to 1 part by mass with respect to 100 parts by mass of the (meth)acrylic polymer. The content of the isocyanate crosslinking agent is preferably 0.02 parts by mass or more from the viewpoint of cohesion, and on the other hand, is preferably 2 parts by mass or less from the viewpoint of suppressing or preventing decrease of adhesive force due to excessive crosslinking formation.

Further, in the pressure-sensitive adhesive, a tackifier; a plasticizer; a filler composed of, a glass fiber, a glass bead, a metallic powder, an inorganic powder, and the like; a pigment; a coloring agent; a filler; an antioxidant; an ultraviolet absorber; a silane coupling agent; and the like may be used as required, and, within a range not departing from the object of the present invention, various additives may be used as appropriate. In addition, a pressure-sensitive adhesive layer that contains fine particles and exhibits light diffusivity may be used.

[4. Laminate Production Method]

The laminate production method of the present invention is not particularly limited, and can be performed by, for example, the production method described below. The following description, however, is illustrative and does not limit the invention in any way. In the following description, a void-containing layer that is a constituent element of the laminate of the present invention may be referred to as a "void-containing layer of the present invention". Furthermore, the void-containing layer production method of the present invention may be referred to as a "void-containing layer production method of the present invention".

[4-1. Void-Containing Layer Production Method] The void-containing layer production method of the present invention is described below with reference to examples. The void-containing layer production method of the present invention, however, is not limited in any way by the following description.

The void-containing layer of the present invention may be formed, for example, of a silicon compound. Also, the void-containing layer of the present invention may be, for example, a void-containing layer formed by chemically bonding microporous particles. For example, the microporous particles may be gel pulverized products.

In the void-containing layer production method of the present invention, for example, the gel pulverization step of pulverizing the porous gel material may be performed by one stage, however, is preferably performed by multiple stages. The number of the pulverization stages is not limited to particular numbers and may be, for example, two, three or more.

In the present invention, the shape of the "particle" (e.g., the particle of the gel pulverized product) is not limited to particular shapes and may be, for example, a spherical shape or non-spherical shape. In the present invention, the particle of the gel pulverized product may be, for example, a sol-gel beaded particle, a nanoparticle (hollow nanosilica/nanoballoon particle), or a nanofiber.

In the present invention, for example, the gel is preferably a porous gel, and the gel pulverized product is preferably a porous gel pulverized product. The present invention, however, is by no means limited thereto.

In the present invention, the gel pulverized product may be in at least one form selected from particulate forms, fibrous forms, and plate-like forms, for example. The particulate structural unit and the plate-like structural unit may be made of an inorganic substance, for example. The constituent element(s) of the particulate structural units includes at least one element selected from the group consisting of Si, Mg, Al, Ti, Zn, and Zr, for example. The particulate structure (structural unit) may be a solid particle or a hollow particle, and specific examples thereof include silicone particles, silicone particles having micropores, silica hollow nanoparticles, and silica hollow nanoballoons. The fibrous structural unit may be, for example, a nanofiber with a nano-sized diameter, and specific examples thereof include cellulose nanofibers and alumina nanofibers. The plate-like structural unit may be, for example, nanoclay, and specific examples thereof include nano-sized bentonite (e.g., Kunipia F (trade name)). The fibrous structural unit is not particularly limited, and may be, for example, at least one fibrous substance selected from the group consisting of carbon nanofibers, cellulose nanofibers, alumina nanofibers, chitin nanofibers, chitosan nanofibers, polymer nanofibers, glass nanofibers, and silica nanofibers.

In the void-containing layer production method of the present invention, the gel pulverization step (e.g., multiple pulverization stages including the first pulverization stage and the second pulverization stage) may be performed in "another solvent", for example. The "another solvent" is described in detail below.

In the present invention, the "solvent" (e.g., a gel production solvent, a void-containing layer production solvent, a replacement solvent) may not dissolve a gel or pulverized products thereof, and the gel or the pulverized products thereof may be dispersed or precipitated in the solvent.

The volume average particle diameter of the gel after the first pulverization stage may be, for example, from 0.5 to 100 µm, from 1 to 100 µm, from 1 to 50 µm, from 2 to 20 µm, or from 3 to 10 µm. The volume average particle diameter of the gel after the second pulverization stage may be, for example, from 10 to 1000 nm, from 100 to 500 nm, or from 200 to 300 nm. The volume average particle diameter indicates a variation in particle size of the pulverized products in the solution containing the gel (gel-containing solution). The volume average particle diameter can be measured using a particle size distribution analyzer based on dynamic light scattering, laser diffraction, or the like, or using an electron microscope such as a scanning electron microscope (SEM) or a transmission electron microscope (TEM), for example.

The void-containing layer production method of the present invention further includes, for example, a step of gelling a massive porous material in a solvent to obtain a gel. In this case, the gel obtained by the gelation step may be used in the first pulverization stage (e.g., the first pulverization stage) among the pulverization stages, for example.

The void-containing layer production method of the present invention further includes, for example, a step of aging the gel in a solvent. In this case, the gel after the aging step may be used in the first pulverization stage (e.g., the first pulverization stage) among the pulverization stages, for example.

In the void-containing layer production method of the present invention, a step of replacing the solvent with "another solvent" is performed after the gelation step, for example. In this case, the gel in "another solvent" may be used in the first pulverization stage (e.g., the first pulverization stage) among the pulverization stages, for example.

For example, the pulverization of the porous material is controlled while measuring the shear viscosity of the solution in at least one of the pulverization stages (e.g., at least one of the first pulverization stage and the second pulverization stage) in the void-containing layer production method of the present invention.

At least one of the pulverization stages (e.g., at least one of the first pulverization stage and the second pulverization stage) in the void-containing layer production method of the present invention is performed by, for example, high pressure media-less pulverization.

In the void-containing layer production method of the present invention, the gel is, for example, a gel of a silicon compound at least containing three or less functional groups having saturated bonds.

Hereinafter, in the void-containing layer production method of the present invention, the gel pulverized product-containing solution obtained by the steps including the gel pulverization step may be referred to as the "gel pulverized product-containing solution of the present invention".

According to the gel pulverized product-containing solution of the present invention, for example, the void-containing layer of the present invention as a functional porous material can be formed by forming a coating film of the solution and chemically bonding the pulverized products in the coating film. According to the gel pulverized product-containing solution of the present invention, for example, the void-containing layer of the present invention can be applied to various objects. Therefore, the gel pulverized product-containing solution of the present invention and the production method of the same are useful, for example, in the production of the void-containing layer of the present invention.

Since the gel pulverized product-containing solution of the present invention has, for example, significantly excellent uniformity, for example, when the void-containing layer of the present invention is applied to an optical member, the appearance of the member can be improved.

The gel pulverized product-containing solution may be, for example, a gel pulverized product-containing solution for obtaining a layer (void-containing layer) having a high void fraction by applying (coating) the gel pulverized product-containing solution onto a base and then drying the coated gel pulverized product-containing solution. The gel pulverized product-containing solution of the present invention may be, for example, a gel pulverized product-containing solution for obtaining a porous material (a bulk body having a large thickness or a massive bulk body) having a high void fraction. The bulk body can be obtained, for example, by performing bulk film formation using the gel pulverized product-containing solution.

For example, the void-containing layer of the present invention having a high void fraction can be produced by a production method including the steps of producing the gel pulverized product-containing solution of the present invention, coating the gel pulverized product-containing solution onto a base to form a coating film, and drying the coating film.

Figure 2:
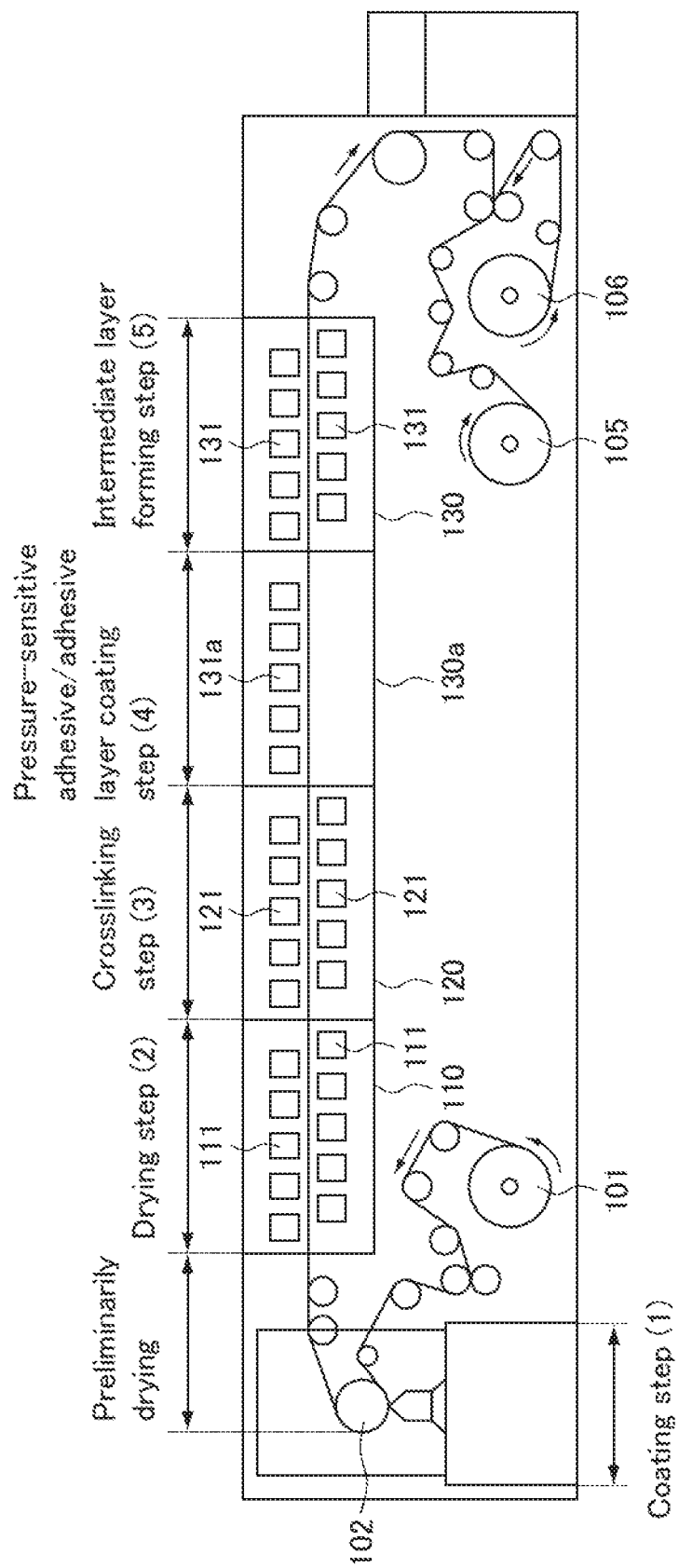
FIG. 2 is a schematic view showing an example of some steps in a method for producing a laminated film in the form of a roll ("laminated film roll") and an apparatus used in the method.
Figure 3:
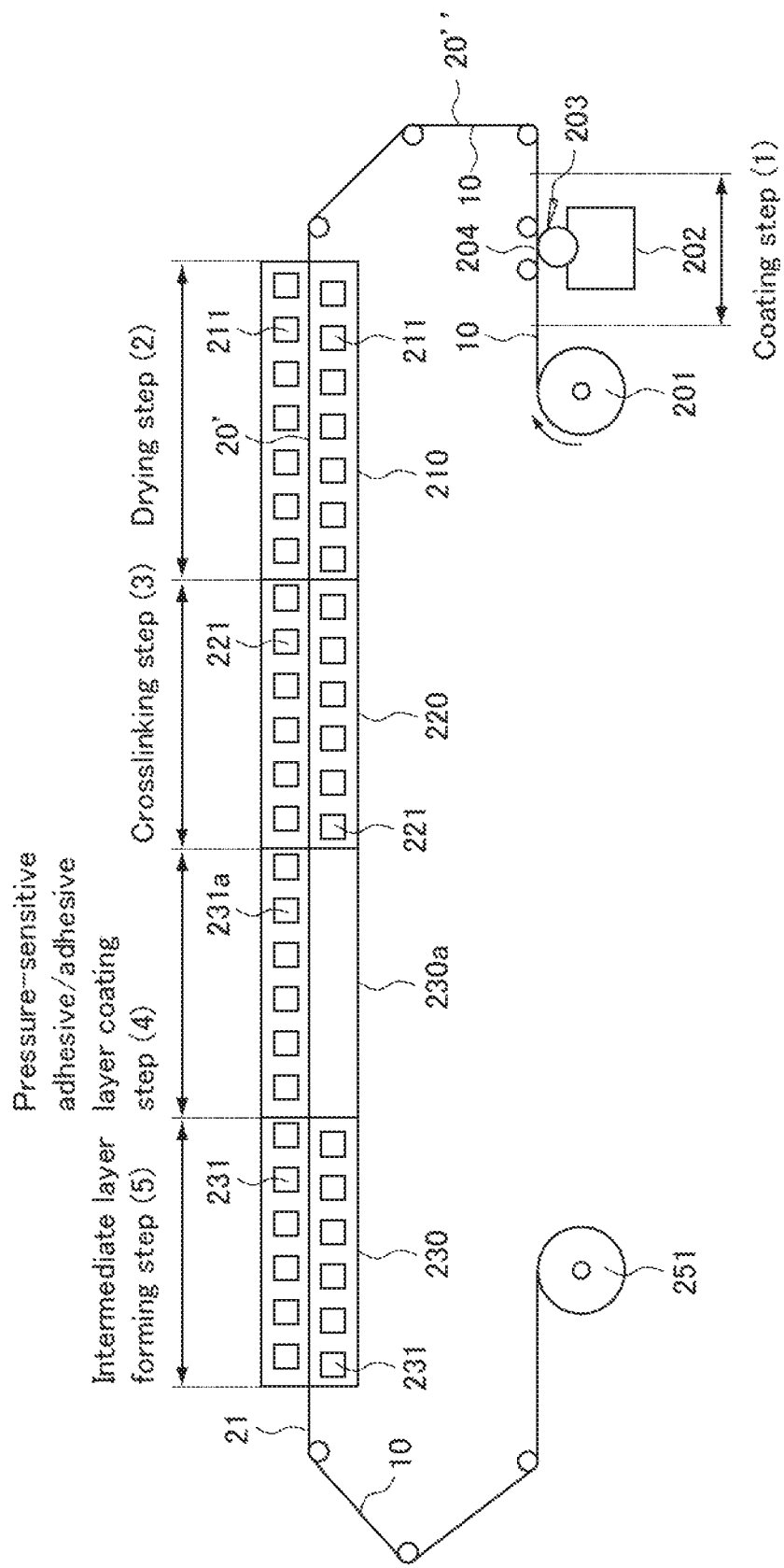
FIG. 3 is a schematic view showing another example of some steps in a method for producing a laminated film roll and an apparatus used in the method.

Further, for example, as shown in FIGS. 2 and 3, a laminated film in the form of a roll (laminated film roll) can be produced by a production method including the steps of producing the gel pulverized product-containing solution of the present invention, feeding the rolled resin film, coating the gel pulverized product-containing solution onto the fed resin film to form a coating film, drying the coating film, and, after the drying step, winding up the laminated film in which the void-containing layer of the present invention is formed on the resin film.

[4-2. Gel Pulverized Product-Containing Solution and Gel Pulverized Product-Containing Solution Production Method]

The gel pulverized product-containing solution of the present invention contains, for example, gel pulverized products pulverized by the gel pulverization step (e.g., the first pulverization stage and the second pulverization stage) and the other solvent.

The void-containing layer production method of the present invention may include, for example, as described above, multiple pulverization stages of a gel pulverization step of pulverizing the gel (e.g., porous gel material), which may include, for example, the first pulverization stage and the second pulverization stage. The present invention will be described below with reference to examples in which the gel pulverized product-containing solution production method of the present invention includes the first pulverization stage and the second pulverization stage. The following description is made mainly for the case where the gel is a porous material (porous gel material). The present invention, however, is by no means limited thereto, and the description of the case where the gel is a porous material (porous gel material) can be applied in an analogical manner to other cases. Hereinafter, the pulverization stages (e.g., the first pulverization stage and the second pulverization stage) in the void-containing layer production method of the present invention may be collectively also referred to as the "gel pulverization step".

The gel pulverized product-containing solution of the present invention can be used in the production of a functional porous material that exhibits the same function as an air layer (e.g., a refractive index) as described below. The functional porous material may be, for example, the void-containing layer of the present invention. Specifically, the gel pulverized product-containing solution obtained by the production method of the present invention contains pulverized products of the porous gel material, the three-dimensional structure of the non-pulverized porous gel material in the pulverized products is destroyed, whereby a new three-dimensional structure different from that of the non-pulverized porous gel material can be formed in the pulverized products. Thus, for example, a coating film (functional porous material precursor) formed using the gel pulverized product-containing solution becomes a layer having a new pore structure (new void-containing structure) that cannot be obtained in a layer formed using the non-pulverized porous gel material. Thereby, the layer having a new pore structure can exhibit the same function (have, for example, the same refractive index) as the air layer. Further, for example, since pulverized products of the gel pulverized product-containing solution of the present invention have residual silanol groups, after forming a new three-dimensional structure as the coating film (functional porous material precursor), the pulverized products can be bonded chemically to each other. Thus, even though the functional porous material to be formed has a structure with void spaces, it can maintain a sufficient strength and sufficient flexibility. Therefore, according to the present invention, the functional porous material can be easily and simply applied to various objects. The gel pulverized product-containing solution obtained by the production method of the present invention is very useful, for example, in the production of the porous structure which can be a substitute for an air layer. In the case of forming an air layer, it is necessary to laminate the components with a space therebetween by providing a spacer or the like to form an air layer between components, for example. However, the functional porous material formed by using the gel pulverized product-containing solution of the present invention can exhibit the same function as the air layer by simply disposing it on an intended site. Therefore, as described above, the present invention can allow various objects to exhibit the same function as that of an air layer easily and simply as compared with the case of forming the air layer.

The gel pulverized product-containing solution of the present invention also can be referred to as, for example, a solution for forming the functional porous material or a solution for forming a void-containing layer or a low refractive index layer. In the gel pulverized product-containing solution of the present invention, the porous material is the pulverized product.

The range of the volume average particle diameter of the pulverized products (particles of porous gel material) in the gel pulverized product-containing solution of the present invention is, for example, from 10 to 1000 nm, from 100 to 500 nm, and from 200 to 300 nm. The volume average particle diameter indicates a variation in particle size of the pulverized products in the gel pulverized product-containing solution according to the present invention. The volume average particle diameter can be measured using a particle size distribution analyzer based on dynamic light scattering, laser diffraction, or the like, or using an electron microscope such as a scanning electron microscope (SEM) or a transmission electron microscope (TEM), as described above, for example.

The concentration of the gel pulverized products in the gel pulverized product-containing solution of the present invention is not limited to particular concentrations and is, for example, from 2.5 to 4.5 wt %, from 2.7 to 4.0 wt %, or from 2.8 to 3.2 wt % as particles with a particle diameter from 10 to 1000 nm.

The gel (e.g., porous gel material) in the gel pulverized product-containing solution of the present invention is not limited to particular gels and can be, for example, a silicon compound.

The silicon compound is not limited to particular compounds and can be, for example, a silicon compound at least containing three or less functional groups having saturated bonds. "Containing three or less functional groups having saturated bonds" means that the silicon compound contains three or less functional groups and these functional groups have saturated bonds with silicon (Si).

The silicon compound is, for example, a compound represented by the following chemical formula (2).

(2)

In the chemical formula (2), for example, X is 2, 3, or 4, $R^1$ and $R^2$ are each a linear or branched alkyl group, $R^1$ and $R^2$ may be the same or different from each other, $R^1$ may be the same or different from each other when X is 2, and $R^2$ may be the same or different from each other.

X and $R^1$ are the same as those in the chemical formula (1) to be described below, for example. Regarding $R^2$, reference can be made to the description as to the examples of $R^1$ in the chemical formula (1), for example.

A specific example of the silicon compound represented by the chemical formula (2) is the one in which X is 3, which is a compound represented by the following chemical formula (2'). In the chemical formula (2'), $R^1$ and $R^2$ are the same as those in the chemical formula (2). When $R^1$ and $R^2$ are both methyl groups, the silicon compound is trimethoxy(methyl)silane (also referred to as "MTMS" hereinafter).

(2')

In the gel pulverized product-containing solution of the present invention, the solvent can be, for example, a dispersion medium. The dispersion medium (hereinafter, also referred to as "coating solvent") is not limited to particular media and can be, for example, a gelation solvent or a pulverization solvent and is preferably the pulverization solvent. The coating solvent contains an organic solvent having a boiling point of 70° C. or higher and less than 180° C. and a saturation vapor pressure of 15 kPa or less at 20° C.

Examples of the organic solvent include carbon tetrachloride, 1,2-dichloroethane, 1,1,2,2-tetrachloroethane, trichloroethylene, isopropyl alcohol, isopropyl alcohol, isopentyl alcohol, 1-pentyl alcohol (pentanol), ethyl alcohol (ethanol), ethylene glycol monoethyl ether, ethylene glycol monoethyl ether acetate, ethylene glycol mono-n-butyl ether, ethylene glycol monomethyl ether, xylene, cresol, chlorobenzene, isobutyl acetate, isopropyl acetate, isopentyl acetate, ethyl acetate, n-butyl acetate, n-propyl acetate, n-pentyl acetate, cyclohexanol, cyclohexanone, 1,4-dioxane, N,N-dimethylformamide, styrene, tetrachloroethylene, 1,1,1-trichloroethane, toluene, 1-butanol, 2-butanol, methyl isobutyl ketone, methyl ethyl ketone, methyl cyclohexanol, methyl cyclohexanone, methyl n-butyl ketone, and isopentanol. The dispersion medium may contain an appropriate amount of a perfluoro-based surfactant or silicon-based surfactant that reduces the surface tension.

The gel pulverized product-containing solution can be, for example, a sol particle solution obtained by dispersing the pulverized products in the dispersion medium. By coating the gel pulverized product-containing solution of the present invention onto the base, drying the gel pulverized product-containing solution, and chemically crosslinking the particles in the gel pulverized product-containing solution in the bonding step to be described below, for example, a void-containing layer having film strength at or above a certain level can be formed continuously. The term "sol" as used in the present invention refers to a state where, by pulverizing a three-dimensional structure of a gel, pulverized products (i.e., particles of porous sol material each having a three-dimensional nanostructure holding part of the void-containing structure) are dispersed in a solvent and exhibit fluidity.

A catalyst for chemically bonding the pulverized products of the gel to each other can be added to the gel pulverized product-containing solution of the present invention, for example. The content of the catalyst is not limited to particular contents and is, for example, from 0.01 to 20 wt %, from 0.05 to 10 wt %, or from 0.1 to 5 wt %, relative to the weight of the gel pulverized products.

The gel pulverized product-containing solution of the present invention may contain a crosslinking assisting agent for indirectly bonding the pulverized products of the gel, for example. The content of the crosslinking assisting agent is not limited to particular contents and is, for example, from 0.01 to 20 wt %, from 0.05 to 15 wt %, or from 0.1 to 10 wt % with respect to the weight of the pulverized product of the gel.

The proportion of functional groups that are not involved in a crosslinked structure inside the gel among functional groups of structural unit monomers of the gel in the pulverized product-containing solution of the present invention may be, for example, 30 mol % or less, 25 mol % or less, 20 mol % or less, or 15 mol % or less, and may be, for example, 1 mol % or more, 2 mol % or more, 3 mol % or more, or 4 mol % or more. The proportion of functional groups that are not involved in the crosslinked structure inside the gel can be measured as follows, for example.

(Measurement Method of Proportion of Functional Groups that are not Involved in Crosslinked Structure Inside Gel)

The gel after drying is subjected to a solid state NMR (Si-NMR), and the proportion of residual silanol groups that are not involved in a crosslinked structure (functional groups that are not involved in the crosslinked structure inside the gel) is calculated from the peak ratio obtained by the NMR. Further, when the functional group is other than the silanol group, the proportion of functional groups that are not involved in a crosslinked structure inside the gel can be calculated from the peak ratio obtained by the NMR according to this method.

The gel pulverized product-containing solution production method of the present invention will be described below with reference to examples. Regarding the gel pulverized product-containing solution of the present invention, reference can be made to the following description unless otherwise stated.

A mixing step of mixing particles (pulverized products) of the porous gel material and the solvent is an optional step, and the gel pulverized product-containing solution production method of the present invention may or may not include the mixing step. A specific example of the mixing step includes, for example, a step of mixing a dispersion medium and pulverized products of a gelled silicon compound (silicon compound gel) obtained from a silicon compound at least containing three or less functional groups having saturated bonds. In the present invention, the pulverized products of the porous gel material can be obtained from the porous gel material by the gel pulverization step to be described below, for example. The pulverized products of the porous gel material can be obtained from the porous gel material that is obtained after an aging treatment in an aging step to be described below, for example.

In the gel pulverized product-containing solution production method of the present invention, the gelation step is, for example, a step of gelling a massive porous material in a solvent to produce a porous gel material. A specific example of the gelation step can be, for example, a step of gelling a silicon compound at least containing three or less functional groups having saturated bonds in a solvent to generate a silicon compound gel.

The gelation step will be described below with reference to the case where the porous material is a silicon compound as an example.

The gelation step is, for example, a step of gelling the monomer silicon compound by a dehydration condensation reaction in the presence of a dehydration condensation catalyst, and by the gelation step, a silicon compound gel is obtained. The silicon compound gel has, for example, a residual silanol group, and the residual silanol group is preferably adjusted, as appropriate, according to the chemical bonding among pulverized products of the silicon compound gel to be described below.

In the gelation step, the silicon compound is only required to be gelled by a dehydration condensation reaction and is not limited to particular compounds. For example, the silicon compounds are bonded by the dehydration condensation reaction. Bonding between the silicon compounds is, for example, hydrogen bonding or intermolecular force bonding.

The silicon compound can be, for example, a silicon compound represented by the chemical formula (1). The silicon compound represented by the chemical formula (1) has hydroxyl groups. Thus, silicon compounds of the chemical formula (1) can be bonded to each other by hydrogen bonding or intermolecular bonding via their hydroxyl groups, for example.

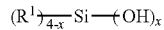
$(R^1)_{4-x}$—Si—$(OH)_x$ (1)

In the chemical formula (1), X is 2, 3, or 4, and IV is a linear or a branched alkyl group, for example. The number of carbon atoms in IV is 1 to 6, 1 to 4, or 1 to 2, for example. The linear alkyl group is a methyl group, an ethyl group, a propyl group, a butyl group, a pentyl group, or a hexyl group, for example. The branched alkyl group is an isopropyl group or an isobutyl group, for example. The X is 3 or 4, for example.

A specific example of the silicon compound represented by the chemical formula (1) is the one in which X is 3, which is a compound represented by the following chemical formula (1'). In the chemical formula (1'), IV is the same as that in the chemical formula (1), and is, for example, a methyl group. When IV is a methyl group, the silicon compound is tris(hydroxy)methylsilane. When X is 3, the silicon compound is a trifunctional silane having three functional groups, for example.

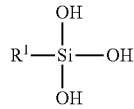

$R^1$—Si—OH with OH above and OH below (1')

Another specific example of the silicon compound represented by the chemical formula (1) is the one in which X is 4. In this case, the silicon compound is a tetrafunctional silane having four functional groups, for example.

The silicon compound may be a precursor for forming a silicon compound represented by the chemical formula (1) by hydrolysis, for example. The precursor is not limited as long as it can generate the silicon compound when it is hydrolyzed, for example. A specific example of the silicon compound precursor is a compound represented by the chemical formula (2).

When the silicon compound is a precursor represented by the chemical formula (2), the production method of the present invention may further include the step of hydrolyzing the precursor prior to the gelation step, for example.

The method for the hydrolysis of the precursor is not limited to particular methods, and the precursor can be hydrolyzed through a chemical reaction in the presence of a catalyst, for example. Examples of the catalyst include acids such as an oxalic acid and an acetic acid. The hydrolysis reaction can be caused by, for example, adding an aqueous oxalic acid solution dropwise slowly to a solution of the silicon compound precursor in dimethylsulfoxide at room temperature and then stirring the resultant mixture for about 30 minutes. In hydrolysis of the silicon compound precursor, for example, by hydrolyzing the alkoxy group of the silicon compound precursor completely, it is possible to more efficiently achieve gelation and aging to be performed subsequently and heating and immobilization to be performed after the formation of a void-containing structure.

In the present invention, the silicon compound can be, for example, a hydrolysate of trimethoxy(methyl)silane.

The monomer silicon compound is not limited to particular compounds and can be selected, as appropriate, according to the intended use of the functional porous material to be produced, for example. In production of the functional porous material, the silicon compound preferably is the trifunctional silane in terms of its excellent properties to achieve a low refractive index when a premium is placed on the low refractive index, for example. The silicon compound preferably is the tetrafunctional silane from the viewpoint of imparting high abrasion resistance when a premium is placed on strength (e.g., abrasion resistance), for example. As the silicon compound as a raw material of the silicon compound gel, only one type of silicon compound may be used, or two or more types of silicon compounds may be used in combination, for example. Specifically, the silicon compound may be made up of the trifunctional silane only, the tetrafunctional silane only, or both the trifunctional silane and the tetrafunctional silane, for example. Also, the silicon compounds may further include a silicon compound(s) other than the trifunctional silane and the tetrafunctional silane, for example. When two or more types of silicon compounds are used as the silicon compounds, the ratio thereof is not limited to particular ratios and can be set as appropriate.

The gelation of porous material such as the silicon compound can be achieved by a dehydration condensation reaction of the porous bodies, for example. The dehydration condensation reaction preferably is performed in the presence of a catalyst, for example. Examples of the catalyst include dehydration condensation catalysts such as: acid catalysts including a hydrochloric acid, an oxalic acid, and a sulfuric acid; and base catalysts including ammonia, potassium hydroxide, sodium hydroxide, and ammonium hydroxide. The dehydration condensation catalyst particularly preferably is a base catalyst. In the dehydration condensation reaction, the amount of the catalyst to be added relative to the porous material is not limited to particular materials, and is, for example, from 0.01 to 10 mol, from 0.05 to 7 mol, or from 0.1 to 5 mol per mole of the porous material.

The gelation of the porous material such as the silicon compound preferably is performed in a solvent, for example. The proportion of the porous material in the solvent is not limited to particular proportions. Examples of the solvent include dimethylsulfoxide (DMSO), N-methylpyrrolidone (NMP), N,N-dimethylacetamide (DMAc), dimethylformamide (DMF), γ-butyrolactone (GBL), acetonitrile (MeCN), and ethylene glycol ethyl ether (EGEE). One type of solvent may be used, or two or more types of solvents may be used in combination, for example. Hereinafter, the solvent used for the gelation also is referred to as a "gelation solvent".

The conditions for the gelation are not limited to particular conditions. The treatment temperature for treating the solvent containing the porous material is, for example, from 20° C. to 30° C., from 22° C. to 28° C., or from 24° C. to 26° C., and the treatment time for treating the same is, for example, from 1 to 60 minutes, from 5 to 40 minutes, or from 10 to 30 minutes. When the dehydration condensation reaction is performed, the treatment conditions are not limited to particular condition, and the treatment conditions given above as examples also apply to the dehydration condensation reaction. When the porous material is a silicon compound, siloxane bonds are grown and silica primary particles are formed by the gelation, for example. As the reaction further proceeds, the primary particles are connected in the form of a string of beads, whereby a gel having a three-dimensional structure is generated.

The form of the gel obtained from the porous material in the gelation step is not limited to particular forms. The term "gel" generally refers to a solidified state of a solute where particles of the solute have lost their independent mobility owing to interaction and form an aggregate. Among various types of gels, a "wet gel" generally refers to a gel containing a dispersion medium in which particles of a solute build a uniform structure, and a "xerogel" generally refers to a gel from which a solvent is removed and in which particles of a solute form a network structure with void spaces. In the present invention, for example, a wet gel is preferably used as the silicon compound gel. When the porous gel material is a silicon compound gel, the amount of a residual silanol group in the silicon compound gel is not limited to particular amounts and can be, for example, in the same range to be described below.

The porous gel material per se obtained by the gelation may be subjected to the solvent replacement step and the first pulverization stage or may be subjected to an aging treatment in the aging step prior to the first pulverization stage, for example. In the aging step, the gelled porous material (porous gel material) is aged in a solvent. The conditions for the aging treatment in the aging step are not limited to particular conditions, and for example, the porous gel material may be incubated in a solvent at a predetermined temperature. For example, by further growing the primary particles of the porous gel material having a three-dimensional structure obtained by the gelation through the aging treatment, it is possible to increase the size of the particles themselves. As a result, the contact area at the neck portion where the particles are in contact with each other increases so that the contact state can be changed from point contact to surface contact. The above-described aging treatment of the porous gel material improves the strength of the gel itself, for example, whereby the strength of the three-dimensional basic structures of the pulverized products after pulverization can be improved. As a result, it is possible to reduce the possibility that, in the drying step to be performed after coating a base with the gel pulverized product-containing solution according to the present invention to form a coating film, pores in the void-containing structure formed by deposition of the three-dimensional basic structures may become smaller as the solvent in the coating film volatilizes during the drying step, for example.

As to the temperature for the aging treatment, the lower limit thereof is, for example, 30° C. or higher, 35° C. or higher, or 40° C. or higher. The upper limit thereof is, for example, 80° C. or lower, 75° C. or lower, or 70° C. or lower. The range thereof is, for example, from 30° C. to 80° C., from 35° C. to 75° C., or from 40° C. to 70° C. The predetermined time is not limited to particular times. The lower limit thereof is, for example, 5 hours or more, 10 hours or more, or 15 hours or more. The upper limit thereof is, for example, 50 hours or less, 40 hours or less, or 30 hours or less. The range thereof is, for example, from 5 to 50 hours, from 10 to 40 hours, or from 15 to 30 hours. Optimal aging conditions are, for example, as described above, conditions set to increase the size of the primary particles and to increase the contact area at the neck portion in the porous gel material. Furthermore, it is preferable to take the boiling point of the solvent used into consideration for the temperature in the aging treatment in the aging step, for example. For example, when the aging temperature is too high in the aging treatment, the solvent may volatilize excessively to cause defectiveness such that the pores in the three-dimensional void-containing structure are closed due to the condensation of the concentration of the coating solution. On the other hand, for example, when the aging temperature is too low in the aging treatment, the effect of the aging cannot be obtained sufficiently. Besides, variation in temperature over time in a mass production process increases, which may result in products with poor quality.

In the aging treatment, the same solvent as in the gelation step can be used, for example. Specifically, it is preferable that a reactant obtained after the gelation treatment (i.e., the solvent containing the porous gel material) is subjected to the aging treatment as it is. When the porous gel material is the silicon compound gel, the amount of residual silanol groups contained in the silicon compound gel having been subjected to the gelation and the subsequent aging treatment by mole indicates, for example, the proportion of the residual silanol groups, assuming that the amount of the alkoxy groups in the raw material used in the gelation (e.g., the silicon compound or the precursor thereof) by mole is 100. The lower limit thereof is, for example, 50% or more, 40% or more, or 30% or more. The upper limit thereof is, for example, 1% or less, 3% or less, or 5% or less. The range thereof is, for example, from 1% to 50%, from 3% to 40%, or from 5% to 30%. For the purpose of increasing the hardness of the silicon compound gel, it is preferable that the amount of the residual silanol groups by mole is smaller, for example. When the amount of the silanol groups by mole is too large, there is a possibility that the void-containing structure cannot be maintained until the crosslinking of the functional porous material precursor is completed in formation of the functional porous material, for example. On the other hand, when the number of moles of the silanol groups is too small, there is a possibility that, in bonding step, the functional porous material precursor cannot be crosslinked, so that a sufficient film strength cannot be imparted, for example. The above description is directed to an example where residual silanol groups are used. When the silicon compounds that have been modified with various reactive functional groups are used as raw materials of the silicon compound gel, for example, the same phenomenon can be applied to each of the reactive functional groups.

The porous gel material per se obtained by the gelation is subjected to, for example, an aging treatment in the aging step, then a solvent replacement step, and thereafter the gel pulverization step. In the solvent replacement step, the solvent is replaced with another solvent.

In the present invention, the gel pulverization step is, as described above, a step of pulverizing the porous gel material. The porous gel material after the gelation step may be subjected to the pulverization, and the porous gel material having been subjected to the aging treatment may further be subjected to the pulverization, for example.

Furthermore, as described above, the gel form control step of controlling the shape and the size of the gel may be performed prior to the solvent replacement step (e.g., after the aging step). The shape and the size of the gel to be controlled in the gel form control step is not limited to particular shapes and sizes and are, for example, as described above. The gel form control step may be performed by dividing the gel into solids (3D solid) in an appropriate size and shape, for example.

Moreover, as described above, the gel pulverization step is performed after subjecting the gel to the solvent replacement step. In the solvent replacement step, the solvent is replaced with another solvent. When the solvent is not replaced with another solvent, the following problem may arise. For example, the catalyst and solvent used in the gelation step remain after the aging step to cause gelation of the solution over time and affect the pot life of the gel pulverized product-containing solution to be obtained finally, and the drying efficiency at the time when the coating film formed using the gel pulverized product-containing solution is dried is reduced. Hereinafter, such a solvent in the gel pulverization step is also referred to as a "pulverization solvent".

The pulverization solvent (another solvent) is not limited to particular solvents, and may be, for example, an organic solvent. The organic solvent may be, for example, the one having a boiling point of 140° C. or lower, 130° C. or lower, 100° C. or lower, or 85° C. or lower. Specific examples thereof include isopropyl alcohol (IPA), ethanol, methanol, butanol, n-butanol, 2-butanol, isobutyl alcohol, pentyl alcohol, propylene glycol monomethyl ether (PGME), methyl cellosolve, and acetone. One type of pulverization solvent may be used, or two or more types of pulverization solvents may be used in combination, for example.

When the pulverization solvent has a low polarity, for example, the solvent replacement step is performed by multiple solvent replacement stages, and in the solvent replacement stages, the hydrophilicity of such a solvent may be caused to be lower in a subsequent stage than that in a prior stage. As a result, for example, solvent replacement efficiency can be improved, and the residual amount of a gel production solvent in the gel (e.g., DMSO) can be significantly reduced. Specifically, for example, the solvent replacement step is performed by three solvent replacement stages, and DMSO in a gel may be first replaced with water in the first solvent replacement stage, the water in the gel may then be replaced with IPA in the second solvent replacement stage, and the IPA in the gel may thereafter be replaced with isobutyl alcohol in the third solvent replacement stage.

The combination of the gelation solvent and the pulverization solvent is not limited to particular combinations, and examples thereof include the combinations of: DMSO and IPA; DMSO and ethanol; DMSO and isobutyl alcohol; and DMSO and n-butanol. By replacing the gelation solvent by the pulverization solvent as described above, it is possible to form a more uniform coating film in the formation of the coating film to be described below, for example.

The solvent replacement step is not limited to particular steps and can be performed as follows, for example. That is, first, the gel (e.g., gel after the aging treatment) produced in the gel production step is immersed in or brought into contact with another solvent to dissolve a gel production catalyst in the gel and an alcohol component and water generated by the condensation reaction in the solvent. The solvent in which the gel is immersed or with which the gel is brought into contact is drained, and the gel is again immersed or brought into contact with a new solvent. This is repeatedly performed until the residual amount of the gel production solvent in the gel becomes a desired amount. Each immersion time is, for example, 0.5 hours or more, 1 hour or more, or 1.5 hours or more. The upper limit thereof is not limited to particular times and is, for example, 10 hours or less. The immersion in the solvent may be performed by continuous contact of the solvent with the gel. The temperature during the immersion is not limited to particular temperatures and is, for example, from 20° C. to 70° C., from 25° C. to 65° C., or from 30° C. to 60° C. By heating, the solvent is replaced promptly, and the amount of the solvent required for replacement can be reduced. However, the solvent may be simply replaced at room temperature. Further, for example, when the solvent replacement step is performed by multiple solvent replacement stages, each of the solvent replacement stages may be performed in the manner described above.

When the solvent replacement step is performed by multiple solvent replacement stages, and the hydrophilicity of "another solvent" is caused to be lower in a subsequent stage than that in a prior stage, such a solvent (replacement solvent) is not particularly limited. In the last solvent replacement stage, it is preferable that "another solvent" (replacement solvent) is a void-containing layer production solvent. Examples of the void-containing layer production solvent include a solvent having a boiling point of 140° C. or lower. Examples of the void-containing layer production solvent include alcohol, ether, ketone, an ester solvent, an aliphatic hydrocarbon solvent, and an aromatic solvent. Specific examples of the alcohol having a boiling point of 140° C. or lower include isopropyl alcohol (IPA), ethanol, methanol, n-butanol, 2-butanol, isobutyl alcohol (IBA), 1-pentanol, and 2-pentanol. Specific examples of the ether having a boiling point of 140° C. or lower include propylene glycol monomethyl ether (PGME), methyl cellosolve, and ethyl cellosolve. Specific examples of the ketone having a boiling point of 140° C. or lower include acetone, methyl ethyl ketone, methyl isobutyl ketone, and cyclopentanone. Specific examples of the ester solvent having a boiling point of 140° C. or lower include ethyl acetate, butyl acetate, isopropyl acetate, and normal propyl acetate. Specific examples of the aliphatic hydrocarbon solvent having a boiling point of 140° C. or lower include hexane, cyclohexane, heptane, and octane. Specific examples of the aromatic solvent having a boiling point of 140° C. or lower include toluene, benzene, xylene, and anisole. From the viewpoint of hardly eroding the base (e.g., resin film) during coating, the void-containing layer production solvent is preferably alcohol, ether, or an aliphatic hydrocarbon solvent. One type of pulverization solvent may be used, or two or more types of pulverization solvents may be used in combination. In particular, from the viewpoint of low volatility at room temperature, isopropyl alcohol (IPA), ethanol, n-butanol, 2-butanol, isobutyl alcohol (IBA), pentyl alcohol, propylene glycol monomethyl ether (PGME), methyl cellosolve, heptane, and octane are preferred. In particular, in order to prevent gel material particles (e.g., silica compounds) from scattering, it is preferable that the saturation vapor pressure (volatility) of the void-containing layer production solvent be not too high. As such a solvent, for example, the one containing an aliphatic group having three or four or more carbon atoms is preferable, and the one containing an aliphatic group having four or more carbon atoms is more preferable. The solvent containing an aliphatic group having three or four or more carbon atoms may be, for example, alcohol. Specifically, for such a solvent, isopropyl alcohol (IPA), isobutyl alcohol (IBA), n-butanol, 2-butanol, 1-pentanol, and 2-pentanol are preferable and isobutyl alcohol (IBA) is particularly preferable.

Another solvent (replacement solvent) in a stage other than the last solvent replacement stage is not particularly limited, and examples thereof include alcohol, ether, and ketone. Specific examples of alcohol include isopropyl alcohol (IPA), ethanol, methanol, n-butanol, 2-butanol, isobutyl alcohol (IBA), and pentyl alcohol. Specific examples of ether include propylene glycol monomethyl ether (PGME), methyl cellosolve, and ethyl cellosolve. A specific example of ketone is acetone. Another solvent (replacement solvent) is not limited as long as it can replace the gel production solvent or "another solvent" (replacement solvent) in a previous stage. Also, another (replacement solvent) in a stage other than the last solvent replacement stage is preferably a solvent which does not finally remain in the gel or which hardly erode the base (e.g., resin film) during coating even if it remains in the gel. From the viewpoint of hardly eroding the base (e.g., resin film) during coating, "another solvent" (replacement solvent) in a stage other than the last solvent replacement stage is preferably alcohol. Thus, in at least one of the multiple solvent replacement stages, "another solvent" is preferably alcohol.

In the first solvent replacement stage, "another solvent" may be, for example, water or a mixed solvent containing water in freely-selected proportion. Water or a mixed solvent containing water is highly compatible with a gel production solvent (e.g., DMSO) having a high hydrophilicity, so that the gel production solvent can be easily replaced and is preferable in terms of costs.

The multiple solvent replacement stages may include a stage in which "another solvent" is water, then a stage in which "another solvent" is the one containing an aliphatic group having three or less carbon atoms, and thereafter a stage in which "another solvent" is the one containing an aliphatic group having four or more carbon atoms. At least one of the solvent containing an aliphatic group having three or less carbon atoms and the solvent containing an aliphatic group having four or more carbon atoms may be an alcohol. The alcohol having an aliphatic group having three or less carbon atoms is not particularly limited, and examples thereof include isopropyl alcohol (IPA), ethanol, methanol, and n-propyl alcohol. The alcohol having an aliphatic group having four or more carbon atoms is not particularly limited, and examples thereof include n-butanol, 2-butanol, isobutyl alcohol (IBA), and pentyl alcohol. For example, the solvent containing an aliphatic group having three or less carbon atoms may be isopropyl alcohol, and the solvent containing an aliphatic group having four or more carbon atoms may be isobutyl alcohol.

The inventors of the present invention have found that it is very important to focus on the residual amount of the gel production solvent in order to form a void-containing layer having film strength under a relatively mild condition such as at 200° C. or lower, for example. This finding, which has found independently by the inventors of the present invention, is not described in the prior arts including the patent literature and the non-patent literature.

Although the reason (mechanism) why a void-containing layer having a low refractive index can be produced by reducing the residual amount of the gel production solvent in the gel is not necessarily clear, it is speculated as follows, for example. That is, as described above, the gel production solvent is preferably a high-boiling-point solvent (e.g., DMSO) or the like for the progress of gelation reactions. In production of a void-containing layer by coating and drying a sol solution produced from the gel, it is difficult to completely remove the high-boiling-point solvent at a normal drying temperature and drying time (for example, 1 minute at 100° C., although it is not particularly limited thereto). This is because if the drying temperature is too high or the drying time is too long, problems such as deterioration of the base may arise. In addition, it is speculated that the high-boiling-point solvent remaining at the time of coating and drying enters between the gel pulverized products and slips the pulverized products, whereby the pulverized products are densely deposited. This may decrease the void fraction, so that low refractive index is hardly achieved. That is, conversely, it is speculated that such a phenomenon can be prevented, and low refractive index can be achieved by reducing the residual amount of the high-boiling-point solvent. It is to be noted, however, that the above-described reasons (mechanisms) merely are examples based on the speculation and do not limit the present invention by any means.

In the present invention, the "solvent" (e.g., a gel production solvent, a void-containing layer production solvent, a replacement solvent) may not dissolve a gel or pulverized products thereof, and the gel or the pulverized products thereof may be dispersed or precipitated in the solvent.

As described above, the gel production solvent may have a boiling point of 140° C. or higher, for example.

The gel production solvent is, for example, a water-soluble solvent. In the present invention, the "water-soluble solvent" refers to a solvent that can be mixed with water in a freely-selected ratio.

When the solvent replacement step is performed by multiple solvent replacement stages, the method is not particularly limited, and each of the solvent replacement stages can be performed, for example, as follows. That is, first, the gel is immersed in or brought into contact with "another solvent" to dissolve a gel production catalyst in the gel, an alcohol component generated by the condensation reaction, and water in "another solvent". Thereafter, the solvent in which the gel has been immersed or with which the gel has been brought into contact is drained, and the gel is again immersed or brought into contact with a new solvent. This is repeatedly performed until the residual amount of the gel production solvent in the gel becomes a desired amount. Each immersion time is, for example, 0.5 hours or more, 1 hour or more, or 1.5 hours or more. The upper limit thereof is not limited to particular times and is, for example, 10 hours or less. The immersion in the solvent may be performed by continuous contact of the solvent with the gel. The temperature during the immersion is not limited to particular temperatures and is, for example, from 20° C. to 70° C., from 25° C. to 65° C., or from 30° C. to 60° C. By heating, the solvent is replaced promptly, and the amount of the solvent required for replacement can be reduced. However, the solvent may be simply replaced at room temperature. This solvent replacement stage is performed a plurality of times by gradually changing "another solvent" (replacement solvent) from the one having a high hydrophilicity to the one having a low hydrophilicity (a high hydrophobicity). In order to remove a highly hydrophilic gel production solvent (e.g., DMSO), for example, it is simple and efficient to first use water as a replacement solvent, as described above. After removing the DMSO or the like with water, the water in the gels is replaced with isopropyl alcohol and then with isobutyl alcohol (coating solvent) in this order, for example. That is, since water and isobutyl alcohol have low compatibility, the solvent replacement can be efficiently performed by once replacing with isopropyl alcohol and then with isobutyl alcohol, which is a coating solvent. However, this is an example, and, as described above, "another solvent" (replacement solvent) is not particularly limited.

In the gel production method of the present invention, for example, as described above, the solvent replacement stage may be performed a plurality of times by gradually changing "another solvent" (replacement solvent) from the one having a high hydrophilicity to the one having a low hydrophilicity (having a high hydrophobicity). This can significantly reduce the residual amount of the gel production solvent in the gel as described above. In addition, for example, it is possible to significantly reduce the amount of the solvent to be used and to reduce the cost, as compared with a case of performing the solvent replacement by one stage using only the coating solvent.

Moreover, after the solvent replacement step, the gel pulverization step of pulverizing the gel in the pulverization solvent is performed. Furthermore, for example, as described above, the concentration of the gel may be performed, if necessary, after the solvent replacement step and prior to the gel pulverization step, and the concentration adjustment step may be performed thereafter if necessary. The concentration of the gel after the solvent replacement step and prior to the gel pulverization step can be measured as follows, for example. That is, first, a gel is taken out from "another solvent" (pulverization solvent) after the solvent replacement step. This gel is controlled to be masses in appropriate shapes and sizes (e.g., blocks) by the gel form control step, for example. A solvent adhered to the periphery of each mass of the gel is then removed, and the concentration of the solid content in one mass of the gel is measured by weight dry method. At that time, the concentration of the solid content in each of a plurality of randomly sampled masses (e.g., 6 masses) is measured, and variations of the measured concentrations from the average thereof are calculated, to determine reproducibility of the measured concentrations. In the concentration adjustment step, for example, the concentration of the gel in the gel-containing solution may be decreased by adding "another solvent" (pulverization solvent). Alternatively, in the concentration adjustment step, for example, the concentration of the gel in the gel-containing solution may be increased by evaporating "another solvent" (pulverization solvent).

In the gel pulverized product-containing solution production method of the present invention, for example, as described above, the gel pulverization step may be performed by one stage but is preferably performed by multiple stages. Specifically, for example, the first pulverization stage and the second pulverization stage may be performed. In addition to the first pulverization stage and the second pulverization stage, a further pulverization stage may be performed as the gel pulverization step. That is, in the gel pulverized product-containing solution production method of the present invention, the number of pulverization stages included in the pulverization step is not limited to two and may be three or more.

In the manner as described above, a solution (e.g., a suspension) containing the microporous particles (pulverized products of a gelled compound) can be produced. By further adding a catalyst for chemically bonding the microporous particles after or during the preparation of the solution containing the microporous particles, it is possible to prepare a solution containing the microporous particles and the catalyst. The amount of the catalyst to be added is not particularly limited, and is, for example 0.01 to 20 wt %, 0.05 to 10 wt %, or 0.1 to 5 wt % relative to the weight of the pulverized products of the silicon compound. The catalyst may be, for example, a catalyst that promotes cross-linking of the microporous particles. The chemical reaction for chemically bonding the microporous particles to each other preferably is a reaction utilizing a dehydration condensation reaction of residual silanol groups contained in silica sol molecules. By promoting the reaction between the hydroxyl groups in the silanol groups by the catalyst, the void-containing structure can be cured in a short time, so that continuous film formation becomes possible. The catalyst may be a photoactive catalyst or a thermoactive catalyst, for example. With the use of the photoactive catalyst, in the void-containing layer forming step, the microporous particles can be bonded (e.g., crosslinked) to each other without heating, for example. Accordingly, the shrinkage of the entire void-containing layer is less liable to occur in the void-containing layer forming step, so that it is possible to maintain a higher void fraction, for example. In addition to or instead of the catalyst, a substance that generates a catalyst (catalyst generator) may be used. For example, in addition to or instead of the photoactive catalyst, a substance that generates a catalyst when subjected to light irradiation (photocatalyst generator) may be used, and in addition to or instead of the thermoactive catalyst, a substance that generates a catalyst when heated (thermal catalyst generator) may be used. The photocatalyst generator is not particularly limited, and may be, for example, a photobase generator (a substance that generates a basic catalyst when subjected to light irradiation) or a photoacid generator (a substance that generates an acidic catalyst when subjected to light irradiation). Among them, the photobase generator is preferable. Examples of the photobase generator include 9-anthrylmethyl N,N-diethylcarbamate (trade name: WPBG-018), (E)-1-[3-(2-hydroxyphenyl)-2-propenoyl]piperidine (trade name: WPBG-027), 1-(anthraquinon-2-yl)ethyl imidazole-carboxylate (trade name: WPBG-140), 2-nitrophenylmethyl 4-methacryloyloxypiperidine-1-carboxylate (trade name: WPBG-165), 1,2-diisopropyl-3-[bis(dimethylamino) methylene]guanidium 2-(3-benzoylphenyl)propionate (trade name: WPBG-266), 1,2-dicyclohexyl-4,4,5,5-tetramethyl-biguanidium n-butyltriphenylborate (trade name: WPBG-300), 2-(9-oxoxanthen-2-yl)propionic acid 1,5,7-triazabicyclo[4.4.0]dec-5-ene (Tokyo Kasei Kogyo Co., Ltd.), and a compound containing 4-piperidinemethanol (trade name: HDPD-PB100, manufactured by Heraeus). Note here that the above products with the trade names including "WPBG" are all manufactured by Wako Pure Chemical Industries, Ltd. Examples of the photoacid generator include aromatic sulfonium salt (trade name: SP-170, manufactured by ADEKA), triarylsulfonium salt (trade name: CPI101A, manufactured by San-Apro Ltd.), and aromatic iodonium salt (trade name: Irgacure 250, manufactured by Ciba Japan). The catalyst for chemically bonding the microporous particles to each other is not limited to the photoactive catalyst and the photocatalyst generator, and may be a thermoactive catalyst or a thermal catalyst generator, for example. Examples of the catalyst for chemically bonding the microporous particles to each other include: base catalysts such as potassium hydroxide, sodium hydroxide, and ammonium hydroxide; and acid catalysts such as a hydrochloric acid, an acetic acid, and an oxalic acid. Among them, the base catalysts are preferable. The catalyst or the catalyst generator for chemically bonding the microporous particles to each other can be used by adding it to a sol particle solution (e.g., suspension) containing the pulverized products (microporous particles) immediately before coating the sol particle solution, or can be used in the form of a mixture with a solvent, for example. The mixture may be, for example, a coating solution obtained by adding the catalyst directly to and dissolving the catalyst in the sol particle solution, a solution obtained by dissolving the catalyst or the catalyst generator in a solvent, or a dispersion obtained by dispersing the catalyst or the catalyst generator in a solvent. The solvent is not particularly limited, and examples thereof include various organic solvents, water, and buffer solutions.

Furthermore, for example, after the solution containing the microporous particles is produced, by adding a small amount of a high-boiling-point solvent to the solution containing the microporous particles, the appearance of the film in film formation by coating can be improved. The amount of the high-boiling-point solvent is not particularly limited, and is, for example, 0.05 to 0.8 times, 0.1 to 0.5 times, and particularly 0.15 to 0.4 times relative to the solid content of the solution containing the microporous particles. The high-boiling-point solvent is not particularly limited and examples thereof include dimethyl sulfoxide (DMSO), N,N-dimethylformamide (DMF), N,N-dimethylacetamide (DMAc), N-methylpyrrolidone (NMP), γ-butyl lactone (GBL), and ethylene glycol ethyl ether (EGEE). In particular, a solvent having a boiling point of 110° C. or higher is preferable, and the present invention is not limited to the specific examples described above. It is considered that the high-boiling-point solvent serves as a leveling agent in film forming in which particles are aligned. It is preferable to use the above-described high-boiling-point solvent also in the gel synthesis. It is to be noted, although details are unknown, the high-boiling-point solvent effectively acts when the high-boiling-point solvent is newly added to the solution containing the microporous particles produced after the solvent used in the synthesis has completely removed. In addition, the added high-boiling-point solvent remains in the film skeleton even after the film is formed, and it is considered that this affects the penetration of the pressure-sensitive adhesive directly laminated on the film into the voids in the film. That is, it is presumed that the slight difference in solvent solubility with respect to the high-boiling-point solvent in the film of the pressure-sensitive adhesive is one of the factors causing the difference in penetration of the pressure-sensitive adhesive into the voids in the film. It is to be noted, however, that the above-described mechanisms merely are examples and do not limit the present invention by any means.

[4-3. Laminate Production Method, Void-Containing Layer Production Method, and Pressure-Sensitive Adhesive/Adhesive Layer Production Method]

The laminate production method of the present invention is described together with the methods of producing the void-containing layer and pressure-sensitive adhesive/adhesive layer that configure the laminate, with reference to examples. The methods will be described below mainly with reference to a case in which the void-containing layer of the present invention is a silicone porous material formed of a silicon compound. The void-containing layer of the present invention, however, is not limited only to a silicone porous material. Regarding the case in which the void-containing layer is other than a silicone-porous material, reference can be made to the following description unless otherwise stated.

The void-containing layer production method of the present invention includes, for example, the steps of forming a void-containing layer precursor using the gel pulverized product-containing solution of the present invention, and chemically bonding the pulverized products of the gel pulverized product-containing solution contained in the precursor. The precursor may be referred to as a coating film, for example.

According to the void-containing layer production method of the present invention, for example, a porous structure having the same function as an air layer is formed. The reason for this is speculated as follows, for example. The present invention, however, is not limited by this speculation. The reason will be described below with reference to a case in which the void-containing layer is a silicone porous material.

The gel pulverized product-containing solution used in the method for producing the silicone porous material contains pulverized products of the silicon compound gel. Thus, the three-dimensional structure of the gelled silica compound is dispersed in three-dimensional basic structures of the pulverized products. Thus, in the method for producing the silicone porous material, when the precursor (e.g., coating film) is formed using the gel pulverized product-containing solution, the three-dimensional basic structures are deposited, and the void-containing structure based on the three-dimensional basic structures are formed, for example. That is, according to the method for producing a silicone porous material, a new porous structure different from that of the silicon compound gel is formed of the pulverized products having the three-dimensional basic structures. Moreover, in the method for producing a silicone porous material, the pulverized products are further chemically bonded to each other, whereby the new three-dimensional structure is immobilized. Thus, even though the silicone porous material to be obtained by the method for producing the silicone porous material has a structure with void spaces, it can maintain a sufficient strength and sufficient flexibility. The void-containing layer (e.g., silicone porous material) obtained by the present invention can be used as a member utilizing voids in a wide range of products such as heat insulating materials, sound absorbing materials, optical members, ink-receiving layers, and the like, for example. Furthermore, a laminated film having various functions imparted therein can be produced using the void-containing layer.

Regarding the void-containing layer production method of the present invention, reference can be made to the description as to the gel pulverized product-containing solution of the present invention unless otherwise stated.

In the precursor forming step of forming a porous material precursor, the gel pulverized product-containing solution of the present invention is coated on the base, for example. By coating the gel pulverized product-containing solution of the present invention onto, for example, a base, drying the coating film, and thereafter chemically bonding (e.g., cross-linking) pulverized products in the bonding step, for example, a void-containing layer having a film strength at or above a certain level can be formed continuously.

The amount of the gel pulverized product-containing solution to be coated onto the base is not particularly limited, and can be set as appropriate depending on, for example, a desired thickness of the void-containing layer of the present invention. As a specific example, when the silicone porous material having a thickness from 0.1 μm to 1000 μm is to be formed, the amount of the pulverized products to be coated onto the base is, for example, in the range from 0.01 to 60000 μg, 0.1 to 5000 μg, or 1 to 50 μg per square meter of the base. It is difficult to uniquely define a preferable amount of the gel pulverized product-containing solution to be coated, because it may be affected by the concentration of the solution, the coating method, etc., for example. However, in terms of productivity, it is preferable to make a coating layer as thin as possible. When the coating amount is too large, for example, it is likely that the solvent may be dried in a drying oven before it volatilizes. If the solvent is dried before the void-containing structure is formed by the sedimentation and deposition of nano-sized pulverized sol particles in the solvent, formation of void spaces may be inhibited to lower the void fraction considerably. On the other hand, when the coating amount is too small, the risk of cissing due to unevenness, variation in hydrophilicity and hydrophobicity, etc. on the surface of the base may increase.

After the gel pulverized product-containing solution is coated on the base, the porous material precursor (coating film) may be subjected to a drying treatment. The purpose of the drying treatment is not only to remove the solvent in the porous material precursor (the solvent contained in the gel pulverized product-containing solution) but also to allow the sedimentation and deposition of the sol particles to occur to form a void-containing structure during the drying treatment, for example. The temperature of the drying treatment is from 50° C. to 250° C., from 60° C. to 150° C., or from 70° C. to 130° C., for example, and the time of the drying treatment is from 0.1 to 30 minutes, from 0.2 to 10 minutes, or from 0.3 to 3 minutes, for example. In terms of continuous productivity and realization of high void fraction, it is preferable to set the temperature and the time of the drying treatment lower and shorter, respectively, for example. If the conditions are too stringent, the following problem may arise, for example. That is, when the base is a resin film, for example, the base may extend in a drying oven as the temperature approaches the glass-transition temperature of the base, so that a void-containing structure formed immediately after the coating may have defects such as cracks. On the other hand, when the conditions are too mild, the following problem may arise, for example. That is, the film may contain a residual solvent when it comes out of the drying oven, so that, if the film rubs against a roller in a subsequent step, defects in appearance such as scratches may be caused.

The drying treatment may be natural drying, heat drying, or drying under reduced pressure, for example. The drying method is not particularly limited, and a commonly used heating unit can be used, for example. Examples of the heating unit include a hot air fan, a heating roller, and a far-infrared heater. In particular, from the viewpoint of performing continuous production industrially, heat drying is preferable. It is preferable to use a solvent having a low surface tension for the purpose of inhibiting the shrinkage stress that may occur as the solvent volatizes during the drying process and inhibiting a crack phenomenon in the void-containing layer (the silicone porous material) caused by the shrinkage stress. Examples of the solvent include, but are not limited to, lower alcohols (typically, isopropyl alcohol [IPA]), hexane, and perfluorohexane.

The base is not limited to particular bases, and for example, a base made of a thermoplastic resin, a base made of glass, an inorganic base plate typified by silicon, a plastic formed of a thermosetting resin, an element such as a semiconductor, or a carbon fiber-based material typified by carbon nanotube can be favorably used. The base, however, is by no means limited thereto. Examples of the form of the base include a film and a plate. Examples of the thermoplastic resin includes polyethylene terephthalate (PET), acrylic resins, cellulose acetate propionate (CAP), cycloolefin polymer (COP), triacetylcellulose (TAC), polyethylene naphthalate (PEN), polyethylene (PE), and polypropylene (PP).

In the void-containing layer production method of the present, the bonding step is a step of chemically bonding the pulverized products contained in the porous material precursor (coating film). By the bonding step, the three-dimensional structures of the pulverized products in the porous material precursor are immobilized, for example. In the case of conventional immobilization by sintering, for example, a treatment at a high temperature of at least 200° C. is performed to induce the dehydration condensation reaction of silanol groups and the formation of siloxane bonds. In the bonding step of the present invention, various additives that catalyze the above-described dehydration condensation reaction are caused to react with each other. With this configuration, for example, when the base is a resin film, it is possible to continuously form and immobilize the void-containing structure at a relatively low drying temperature of around 100° C. and with a short treatment time of less than several minutes without damaging the base.

The method for achieving the above-described chemical bonding is not particularly limited, and can be determined as appropriate depending on the type of the gel (e.g. silicon compound gel), for example. As a specific example, the chemical bonding can be achieved by chemically crosslinking the pulverized products. Besides this, for example, when inorganic particles such as titanium oxide particles are added to the pulverized products, the inorganic particles and the pulverized products may be chemically bonded by crosslinking. Furthermore, in the case of causing the pulverized products to carry a biocatalyst such as an enzyme, a site of the catalyst other than the catalytic site may be chemically crosslinked with the pulverized products. Therefore, the present invention is not only applicable to a void-containing layer formed by sol particles bonded to each other, but the applicable range of the present invention can be expanded to an organic-inorganic hybrid void-containing layer and a host-guest void-containing layer, for example. It is to be noted, however, that the applicable range of the present invention is not limited thereto.

Depending on the type of the gel pulverized product (e.g. silicon compound gel), the bonding step can be carried out by causing a chemical reaction in the presence of a catalyst, for example. The chemical reaction in the present invention preferably is a reaction utilizing a dehydration condensation reaction of residual silanol groups contained in the pulverized products of the silicon compound gel. By promoting the reaction between the hydroxyl groups in the silanol groups by the catalyst, the void-containing structure can be cured in a short time, so that continuous film formation becomes possible. Examples of the catalyst include, but are not limited to, base catalysts such as potassium hydroxide, sodium hydroxide, and ammonium hydroxide and acid catalysts such as a hydrochloric acid, an acetic acid, and an oxalic acid. As a catalyst to be used in the dehydration condensation reaction, a base catalyst is particularly preferable. Also, catalysts that exhibit catalytic activity when irradiated with light (e.g., ultraviolet rays), such as photoacid generation catalysts and photobase generation catalysts can be used preferably. The photoacid generation catalysts and photobase generation catalysts are not particularly limited, and are as described above, for example. For example, it is preferable to add the catalyst to a sol particle solution containing the pulverized products immediately before coating the sol particle solution as described above, or to use the catalyst in the form of a mixture with a solvent, for example. The mixture may be, for example, a coating solution obtained by adding the catalyst directly to and dissolving the catalyst in the sol particle solution, a solution obtained by dissolving the catalyst in a solvent, or a dispersion obtained by dispersing the catalyst in a solvent. The solvent is not particularly limited, and examples thereof include water and buffer solutions, as described above.

Furthermore, for example, a crosslinking assisting agent for indirectly bonding the pulverized products of the gel may be further added to the gel-containing solution of the present invention. This crosslinking assisting agent enters the spaces between the respective particles (the pulverized products), where it interacts with or bonds to the particles. This allows the particles somewhat apart from each other to be bonded to each other. As a result, it becomes possible to efficiently improve the strength. The crosslinking assisting agent preferably is a multi-crosslinking silane monomer. Specifically, the multi-crosslinking silane monomer may have at least two and at most three alkoxysilyl groups, the chain length between the alkoxysilyl groups may be at least one and at most ten carbon atoms, and the multi-crosslinking silane monomer may contain an element other than carbon, for example. Examples of the crosslinking assisting agent include bis(trimethoxysilyl)ethane, bis(triethoxysilyl)ethane, bis(trimethoxysilyl)methane, bis(triethoxysilyl)methane, bis(triethoxysilyl)propane, bis(trimethoxysilyl)propane, bis(triethoxysilyl)butane, bis(trimethoxysilyl)butane, bis(triethoxysilyl)pentane, bis(trimethoxysilyl)pentane, bis(triethoxysilyl)hexane, bis(trimethoxysilyl)hexane, bis(trimethoxysilyl)-N-butyl-N-propyl-ethane-1,2-diamine, tris-(3-trimethoxysilylpropyl)isocyanurate, and tris-(3-triethoxysilylpropyl)isocyanurate. The amount of the crosslinking assisting agent to be added is not particularly limited, and is, for example, in the range from 0.01 wt % to 20 wt %, from 0.05 wt % to 15 wt %, or from 0.1 wt % to 10 wt % relative to the weight of the pulverized products of the silicon compound.

The chemical reaction in the presence of the catalyst can be caused by, for example: subjecting the coating film containing the catalyst or the catalyst generator previously added to the gel pulverized product-containing solution to light irradiation or heating; subjecting the coating film to light irradiation or heating after spraying the catalyst over the coating film; or subjecting the coating film to light irradiation or heating while spraying the catalyst or the catalyst generator over the coating film. When the catalyst is a photoactive catalyst, the silicone porous material can be formed by chemically bonding the microporous particles to each other by light irradiation. When the catalyst is a thermoactive catalyst, the silicone porous material can be formed by chemically bonding the microporous particles to each other by heating. The irradiation dose (energy) in the above irradiation is not limited to particular amounts and is, for example, from 200 to 800 mJ/cm$^2$, from 250 to 600 mJ/cm$^2$, or from 300 to 400 mJ/cm$^2$, in terms of light at a wavelength of 360 nm. The accumulated amount of light preferably is 200 mJ/cm$^2$ or more, from the viewpoint of preventing the problem in that, owing to insufficient irradiation dose, degradation of the catalyst generator by light absorption may not proceed sufficiently, so that the catalyst generator cannot exhibit its effect sufficiently. The accumulated amount of light preferably is 800 mJ/cm$^2$ or less, from the viewpoint of preventing damage to the base disposed under the void-containing layer so as to prevent the formation of heat wrinkles. The wavelength of light in the irradiation is not limited to particular wavelengths and is, for example, from 200 to 500 nm or from 300 to 450 nm. The irradiation time in the irradiation is not limited to particular times and is, for example, from 0.1 to 30 minutes, from 0.2 to 10 minutes, or from 0.3 to 3 minutes. The conditions for the heat treatment are not limited to particular conditions. The heating temperature is from 50° C. to 250° C., from 60° C. to 150° C., or from 70° C. to 130° C., for example, and the heating time is from 0.1 to 30 minutes, from 0.2 to 10 minutes, or from 0.3 to 3 minutes, for example. It is preferable to use, for example, a solvent having a low surface tension for the purpose of inhibiting the shrinkage stress that may occur as the solvent volatizes during the drying process and inhibiting a crack phenomenon in the void-containing layer caused by the shrinkage stress. Examples of the solvent include, but are not limited to, lower alcohols typically, isopropyl alcohol (IPA), hexane, and perfluorohexane.

The void-containing layer (e.g., silicone porous material) can be produced in the above-described manner. The void-containing layer production method of the present invention, however, is not limited thereto. The void-containing layer of the present invention, which is a silicone porous material, may be referred to as a "silicone porous material of the present invention" in the description below.

In the production of the laminate of the present invention, a pressure-sensitive adhesive/adhesive layer is further formed on the void-containing layer of the present invention (the pressure-sensitive adhesive/adhesive layer forming step). Specifically, the pressure-sensitive adhesive/adhesive layer may be formed by applying (coating) a pressure-sensitive adhesive or an adhesive to the void-containing layer of the present invention, for example. Alternatively, the pressure-sensitive adhesive/adhesive layer may be formed on the void-containing layer of the present invention by adhering, e.g., an adhesive tape including a base and the pressure-sensitive adhesive/adhesive layer laminated on the base to the void-containing layer with the pressure-sensitive adhesive/adhesive layer side of the adhesive tape facing the void-containing layer. In this case, the base of the adhesive tape may be left on the adhesive tape or may be peeled off from the pressure-sensitive adhesive/adhesive layer. In particular, as described above, by peeling the base to form a (baseless) void-containing layer-containing pressure-sensitive adhesive/adhesive sheet having no base, the thickness of the sheet can be significantly reduced and the increase in the thickness of the device or the like can be prevented. In the present invention, the terms "pressure-sensitive adhesive" and "pressure-sensitive adhesive layer" respectively refer to an agent and a layer that adhere a substance in a peelable manner, for example. In the present invention, the terms "adhesive" and "adhesive layer" respectively refer to an agent and a layer that adhere a substance in a non-peelable manner, for example. It is to be noted, however, that, in the present invention, the "pressure-sensitive adhesive" and the "adhesive" are not always clearly distinguishable from each other, and also, the "pressure-sensitive adhesive layer" and the "adhesive layer" are not always clearly distinguishable from each other. In the present invention, a pressure-sensitive adhesive or an adhesive for forming the pressure-sensitive adhesive/adhesive layer is not particularly limited, and a commonly used pressure-sensitive adhesive or adhesive can be used, for example. Examples of the pressure-sensitive adhesive and the adhesive include: polymer adhesives such as acrylic adhesives, vinyl alcohol adhesives, silicone adhesives, polyester adhesives, polyurethane adhesives, and polyether adhesives; and rubber adhesives. Further, the pressure-sensitive adhesive and the adhesive may be an adhesive composed of a water-soluble crosslinking agent of a vinyl alcohol polymer such as glutaraldehyde, melamine, or an oxalic acid. Examples of the pressure-sensitive adhesive include those described above. Only one type of pressure-sensitive adhesive or adhesive may be used, or two or more types of pressure-sensitive adhesives or adhesives may be used in combination (e.g., they may be mixed together or may be laminated). As described above, the void-containing layer can be protected from physical damage (particularly abrasion) by the pressure-sensitive adhesive/adhesive layer. It is preferable that the pressure-sensitive adhesive/adhesive layer have excellent pressure resistance so that the void-containing layer does not collapse even used as a (baseless) void-containing layer-containing pressure-sensitive adhesive/adhesive sheet having no base, however, is not limited thereto. The thickness of the pressure-sensitive adhesive/adhesive layer is not particularly limited, and is, for example, from 0.1 to 100 μm, from 5 to 50 μm, from 10 to 30 μm, or from 12 to 25 μm.

The void-containing layer of the present invention obtained in this manner may be further laminated on another film (layer) to form a laminated structure including the porous structure, for example. In this case, the respective components of the laminated structure may be laminated via the pressure-sensitive adhesive/adhesive layer (pressure-sensitive adhesive or an adhesive), for example.

The respective components may be laminated by continuous processing using a long film (e.g., the so-called "roll-to-roll" process) in terms of efficiency, for example. When the base is a molded product, an element, or the like, the components that have been subjected to batch processing may be laminated on the base.

Regarding the method for forming the laminate of the present invention on a base (resin film), continuous processing steps will be described below with reference to illustrative examples shown in FIGS. 1 to 3. FIG. 2 shows, after the film formation of the void-containing layer (silicone porous body), the steps of attaching a protective film to the thus-formed film and winding up the thus-obtained laminate. However, in the case where the void-containing layer is laminated on another functional film, this may be achieved in the above-described manner, or alternatively, in the following manner: after performing coating and drying for forming the functional film, the void-containing layer formed into a film is adhered to the functional film immediately before being wound-up. It should be noted that the film forming processes shown in FIGS. 1 to 3 are merely illustrative and do not limit the present invention by any means.

The base may be the resin film described above. In this case, the void-containing layer of the present invention is obtained by forming the void-containing layer on the base. The void-containing layer of the present invention also is obtained by forming the void-containing layer on the base and then laminating the void-containing layer on the resin film described above in connection with the void-containing layer of the present invention.

The cross-sectional view of FIG. 1 schematically shows an example of a process of the method of producing the laminate of the present invention in which the void-containing layer, the intermediate layer, and the pressure-sensitive adhesive/adhesive layer are laminated in this order on the base (resin film). In FIG. 1, the method for forming the void-containing layer includes a coating step (1) of coating the sol particle solution 20" of pulverized products of a gelled compound onto a base (resin film) 10 to form a coating film, a drying step (2) of drying the sol particle solution 20" to form a dried coating film 20', a chemical treatment step (for example, a crosslinking step) (3) of subjecting the coating film 20' to a chemical treatment (for example, crosslinking treatment) to form a void-containing layer 20, a pressure-sensitive adhesive/adhesive layer coating step (pressure-sensitive adhesive/adhesive layer forming step) (4) of coating the pressure-sensitive adhesive/adhesive layer 30 onto the void-containing layer 20, and an intermediate layer forming step (5) of forming the intermediate layer 22 by reacting the void-containing layer 20 with the pressure-sensitive adhesive/adhesive layer 30. The chemical treatment step (crosslinking step) (3) corresponds to the "void-containing layer forming step" in the laminated film production method of the present invention. In FIG. 1, the intermediate layer forming step (5) (hereinafter sometimes referred to as an "aging step") also serves as a step for improving the strength of the void-containing layer 20 (crosslinking reaction step for causing a crosslinking reaction inside the void-containing layer 20), and after the intermediate layer forming step (5), the void-containing layer 20 is changed to a void-containing layer having improved strength. The present invention, however, is not limited thereto, and for example, the void-containing layer 20 may not be changed after the intermediate layer forming step (5). As described above, the pressure-sensitive adhesive/adhesive layer forming step is not limited to pressure-sensitive adhesive/adhesive layer coating, and may be, for example, a pressure-sensitive adhesive tape including the pressure-sensitive adhesive/adhesive layer may be adhered to the void-containing layer 20, for example.

Through the above steps (1) to (5), as shown in FIG. 1, a laminated film in which the void-containing layer 20, the intermediate layer 22, and the pressure-sensitive adhesive/adhesive layer 30 are laminated in this order on the resin film 10 can be produced. The intermediate layer forming step (5), however, is not always necessary, and the produced laminate of the present invention may not include the intermediate layer. Furthermore, the laminated film production method of the present invention may or may not appropriately include steps other than the above steps (1) to (5).

In the coating step (1), the method for coating the sol particle solution 20" is not particularly limited, and a commonly used coating method can be employed. Examples of the coating method include a slot die method, a reverse gravure coating method, a micro-gravure method (micro-gravure coating method), a dip method (dip coating method), a spin coating method, a brush coating method, a roller coating method, a flexography, a wire-bar coating method, a spray coating method, an extrusion coating method, a curtain coating method, and a reverse coating method. Among them, from the viewpoint of productivity, smoothness of a coating film, etc., the extrusion coating method, the curtain coating method, the roller coating method, and the micro-gravure coating method are preferable. The coating amount of the sol particle solution 20" is not particularly limited, and can be set as appropriate so that the void-containing layer 20 having a suitable thickness is obtained, for example. The thickness of the void-containing layer 20 is not particularly limited, and is as described above, for example.

In the drying step (2), the sol particle solution 20" is dried (i.e., a dispersion medium contained in the sol particle solution 20" is removed) to form the coating film after drying (precursor of void-containing layer) 20'. The conditions for the drying treatment are not particularly limited, and may be as described above.

In the chemical treatment step (3), the coating film 20' containing a catalyst or a catalyst generator (e.g., a photoactive catalyst, a photocatalyst generator, a thermoactive catalyst, or a thermal catalyst generator) added prior to the coating step is irradiated with light or heated, whereby the pulverized products in the coating film 20' are chemically bonded (e.g., crosslinked) to each other. As a result, the void-containing layer 20 is formed. The conditions for the light irradiation and heating in the chemical treatment step (3) are not particularly limited, and may be as described above.

Further, the pressure-sensitive adhesive/adhesive layer coating step (pressure-sensitive adhesive/adhesive layer forming step) (4) and intermediate layer forming step (5) are performed. The pressure-sensitive adhesive/adhesive layer coating step (pressure-sensitive adhesive/adhesive layer forming step) (4) may include, for example, a heating step of heating the pressure-sensitive adhesive after coating, in addition to the step of coating the pressure-sensitive adhesive. For example, when the pressure-sensitive adhesive is a pressure-sensitive adhesive composition containing a polymer (e.g., (meth)acrylic polymer) and a crosslinking agent, the polymer may be cross-linked by the crosslinking agent by the heating step. The heating step may also serve, for example, as a step of drying the pressure-sensitive adhesive. Further, for example, the heating step may also serve as the intermediate layer forming step (5). The temperature of the heating step is not particularly limited, and is, for example, 70 to 160° C., 80 to 155° C., or 90 to 150° C. The time of the heating step is not particularly limited, and is, for example, 1 to 10 minutes, 1 to 7 minutes, or 2 to 5 minutes.

FIG. 2 schematically shows an example of a slot die coating apparatus and the method for forming a void-containing layer using the same. While FIG. 2 is a sectional view, hatching is omitted for the sake of clarity.

As shown in FIG. 2, the respective steps in the method using this apparatus are performed while conveying a base 10 in one direction by rollers. The conveyance speed is not particularly limited, and is, for example, from 1 to 100 m/min, from 3 to 50 m/min, or from 5 to 30 m/min.

First, while feeding and conveying the base 10 from a delivery roller 101, a coating step (1) of coating a sol particle solution 20" onto the base 10 is performed on a coating roller 102. Subsequently, in an oven zone 110, a drying step (2) is performed. In the coating apparatus shown in FIG. 2, a pre-drying step is performed after the coating step (1) and prior to the drying step (2). The pre-drying step can be performed at room temperature without heating. In the drying step (2), heating units 111 are used. As the heating unit 111, a hot air fan, a heating roll, a far-infrared heater, or the like can be used as appropriate, as described above. Also, for example, the drying step (2) may be divided into two or more steps, and the drying temperatures in the respective steps may be set so that the drying temperature in the first step increases toward the step(s) subsequent thereto.

After the drying step (2), a crosslinking step (3) is performed in a chemical treatment zone 120. In the crosslinking step (3), when a coating film 20' after being dried contains a photoactive catalyst, for example, the coating film 20' is irradiated with light emitted from lamps (light irradiation units) 121 disposed above and below the base 10. On the other hand, when the coating film 20' after being dried contains a thermoactive catalyst, for example, hot air fans (heating units) are used instead of the lamps (light irradiation units) 121, and the base 10 is heated using the hot air fans 121 disposed above and below the base 10. By this crosslinking treatment, pulverized products in the coating film 20' are chemically bonded to each other, whereby a void-containing layer 20 is cured and strengthened. Although the crosslinking step (3) is performed after the drying step (2) in the present example, the timing at which chemical bonding of the pulverized products is caused in the production method of the present invention is not particularly limited, as described above. For example, as described above, the drying step (2) may also serve as the crosslinking step (3). Further, even in the case where the chemical bonding has occurred in the drying step (2), the crosslinking step (3) further may be performed to make the chemical bonds between the pulverized products still stronger. Furthermore, the chemical binding of the pulverized products may occur in the steps (e.g., the pre-drying step, the coating step (1), and a step of preparing the coating solution) prior to the drying step (2).

After the crosslinking step (3), the pressure-sensitive adhesive/adhesive layer coating step (pressure-sensitive adhesive/adhesive layer forming step) (4) of applying (coating) a pressure-sensitive adhesive or an adhesive to a void-containing layer 20 to form a pressure-sensitive adhesive/adhesive layer 30 is performed in the pressure-sensitive adhesive/adhesive layer coating zone 130a using pressure-sensitive adhesive/adhesive layer coating units 131a. As described above, instead of applying (coating) the pressure-sensitive adhesive or the adhesive, an adhesive tape including the pressure-sensitive adhesive/adhesive layer 30 may be adhered (attached) to the void-containing layer 20, for example.

Further, an intermediate layer forming step (aging step) (5) is performed in the intermediate layer forming zone (aging zone) 130 to form an intermediate layer 22 by reacting the void-containing layer 20 with the pressure-sensitive adhesive/adhesive layer 30. In this step, the void-containing layer 20 undergoes an internal crosslinking reaction and turns into a void-containing layer 21 with an improved strength, as described above. The intermediate layer forming step (aging step) (5) may be performed, for example, by heating the void-containing layer 20 and the pressure-sensitive adhesive/adhesive layer 30 using hot air fans (heating units) 131 disposed above and below the base 10. The heating temperature, time, and the like are not particularly limited, and are, for example, as described above.

Then, after the intermediate layer forming step (aging step) (5), a laminate obtained by forming the void-containing layer 20 on the base 10 is wound up by the winding roller 105. In FIG. 2, the void-containing layer 20 in the laminate is protected by being covered with a protecting sheet fed by a roller 106. Instead of the protecting sheet, another layer formed of a long film may be laminated on the void-containing layer 20.

FIG. 3 schematically shows an example of a coating apparatus for a micro-gravure method (micro-gravure coating method) and the method for forming a void-containing layer using the same. While FIG. 3 is a sectional view, hatching is omitted for the sake of clarity.

As shown in FIG. 3, the respective steps in the method using this apparatus are performed while conveying a base 10 in one direction by rollers, as in the example shown in FIG. 2. The conveyance speed is not particularly limited, and is, for example, from 1 to 100 m/min, from 3 to 50 m/min, or from 5 to 30 m/min.

First, while feeding and conveying the base 10 from a delivery roller 201, a coating step (1) of coating a sol particle solution 20″ of the present invention onto the base 10 is performed. As shown in FIG. 3, the sol particle solution 20″ is coated using a solution reservoir 202, a doctor (doctor knife) 203, and a micro-gravure coater 204. Specifically, the sol particle solution 20″ in the solution reservoir 202 is caused to be carried on the surface of the micro-gravure coater 204, and is then coated on the surface of the base 10 with the micro-gravure coater 204 while controlling the thickness of the coating film of the sol particle solution 20″ to a predetermined thickness with the doctor 203. It is to be noted here that the micro-gravure coater 204 merely is an example of a coating unit. The coating unit is not limited to the micro-gravure coater 204, and any coating unit may be employed.

Next, a drying step (2) is performed. Specifically, as shown in FIG. 3, the base 10 having the sol particle solution 20″ coated thereon is conveyed to an oven zone 210. The sol particle solution 20″ is dried by being heated with heating units 211 disposed in the oven zone 210. The heating units 211 may be the same as those in FIG. 2, for example. The drying step (2) may be divided into a plurality of steps by dividing the oven zone 210 into a plurality of sections, for example. The drying temperatures in the respective steps may be set so that the drying temperature in the first step increases toward the step(s) subsequent thereto. After the drying step (2), a chemical treatment step (3) is performed in a chemical treatment zone 220. In the chemical treatment step (3), when a coating film 20′ after being dried contains a photoactive catalyst, for example, the coating film 20′ is irradiated with light emitted from lamps (light irradiation units) 221 disposed above and below the base 10. On the other hand, when the coating film 20′ after being dried contains a thermoactive catalyst, for example, hot air fans (heating units) are used instead of the lamps (light irradiation units) 221, and the base 10 is heated using the hot air fans 221 disposed below the base 10. By this crosslinking treatment, pulverized products in the coating film 20′ are chemically bonded to each other, whereby a void-containing layer 20 is formed.

After the chemical treatment step (3), the pressure-sensitive adhesive/adhesive layer coating step (pressure-sensitive adhesive/adhesive layer forming step) (4) of applying (coating) a pressure-sensitive adhesive or an adhesive to a void-containing layer 20 to form a pressure-sensitive adhesive/adhesive layer 30 is performed in the pressure-sensitive adhesive/adhesive layer coating zone 230a using pressure-sensitive adhesive/adhesive layer coating units 231a. As described above, instead of applying (coating) the pressure-sensitive adhesive or the adhesive, an adhesive tape including the pressure-sensitive adhesive/adhesive layer 30 may be adhered (attached) to the void-containing layer 20, for example.

Further, an intermediate layer forming step (aging step) (5) is performed in the intermediate layer forming zone (aging zone) 230 to form an intermediate layer 22 by reacting the void-containing layer 20 with the pressure-sensitive adhesive/adhesive layer 30. In this step, the void-containing layer 20 turns into a void-containing layer 21 with an improved strength, as described above. The intermediate layer forming step (aging step) (5) may be performed, for example, by heating the void-containing layer 20 and the pressure-sensitive adhesive/adhesive layer 30 using hot air fans (heating units) 231 disposed above and below the base 10. The heating temperature, time, and the like are not particularly limited, and are, for example, as described above.

Then, after the intermediate layer forming step (aging step) (5), a laminated film obtained by forming the void-containing layer 21 on the base 10 is wound up by the winding roller 251. Thereafter, another layer may be laminated on the laminated film, for example. Further, before the laminated film is wound up by the winding roller 251, another layer may be laminated on the laminated film, for example.

EXAMPLES

Examples of the present invention will be described below. It is to be noted, however, that the present invention is by no means limited to the following examples.

In the following reference examples, examples, and comparison examples, the number (relative usage amount) of each substance is the mass part (weight part) unless otherwise stated.

In the following Reference Examples, Examples, and Comparative Examples, the storage elastic modulus of the pressure-sensitive adhesive/adhesive layer at 23° C., the gel fraction of the pressure-sensitive adhesive/adhesive layer, the thickness of each layer, and the weight-average molecular weight of the sol component of the pressure-sensitive adhesive/adhesive layer were measured by the measurement methods described below.

(Measurement Method of Storage Elastic Modulus)

The storage elastic modulus of the pressure-sensitive adhesive/adhesive layer at 23° C. was measured by the following method using a rheometer ARES (trade name of TA Instruments). That is, first, a sheet (layer) that is the same as the pressure-sensitive adhesive/adhesive layer in the following Reference Examples, Examples, and Comparative Examples except that it is in the form of a sheet having a thickness of 2 mm was formed. The sheet was punched into a parallel plate having a diameter of 25 mm, thereby obtaining a measurement sample. The measurement sample was attached to a chuck of the rheometer ARES. Then, the storage elastic modulus at 23° C. was measured by increasing the temperature from −70° C. to 150° C. at a temperature rising rate of 5° C./minute while applying strain at a cycle of 1 Hz.

(Measurement Method of Gel Fraction of Pressure-Sensitive Adhesive/Adhesive Layer)

A measurement sample (dried by heating after coating each of the pressure-sensitive adhesive compositions) was prepared in the same manner as the pressure-sensitive adhesive/adhesive layer in each of the following Reference Examples, Examples, and Comparative Examples. This measurement sample (initial weight W1) was immersed in ethyl acetate and left at room temperature for one week, then the insoluble material was taken out and the dried weight (W2) was measured, and the gel fraction was calculated on the basis of the equation (II) below.

$$\text{Gel fraction (wt \%)} = (W2/W1) \times 100 \quad \text{(II)}$$

In the pressure-sensitive adhesive/adhesive layer in the following Reference Examples, Examples, and Comparative Examples, it is presumed that the polymer (acrylic polymer) was crosslinked by the crosslinking agent by heat-drying the coated pressure-sensitive adhesive and that a crosslinked structure was formed, however, the crosslinked structure was not examined.

(Measurement Method of Thickness)

The thickness was measured using a dial gauge.

(Measurement Method of Weight-Average Molecular Weight of Sol Component of Pressure-Sensitive Adhesive/Adhesive Layer)

From the molecular weight distribution curve measured by gel permeation chromatography (GPC), the weight-average molecular weight of the sol component and the proportion (weight percentage) of the low molecular weight component having a molecular weight of 10,000 or less were calculated. Specifically, first, a measurement sample (dried by heating after coating each of the pressure-sensitive adhesive compositions) was prepared in the same manner as the pressure-sensitive adhesive/adhesive layer in each of the following Reference Examples, Examples, and Comparative Examples. To 200 mg of this measurement sample, 10 ml of tetrahydrofuran (THF) was added, and the resultant was left to stand for 20 hours and then filtered with a 0.45 μm membrane filter. Thereafter, the obtained filtrate was subjected to GPC measurement using the following measurement device under the following measurement conditions, and as described above, the weight-average molecular weight of the sol component and the proportion (weight percentage) of the low molecular weight component having a molecular weight of 10,000 or less were calculated from the molecular weight distribution curve.

GPC measurement device: trade name "AQCUITY APC" (manufactured by WATERS) Column: trade name "G7000HxL+GMHxL+GMHxL" (manufactured by Tosoh Corporation)

Eluent: tetrahydrofuran (THF)

Flow rate: 0.8 mL/min

Detector: differential refractometer (RI)

Column temperature (measurement temperature): 40° C.

Injection amount: 100 μL

Standard: polystyrene

Reference Example 1: Production of Coating Solution for Forming Void-Containing Layer First, gelation of silicon compound (the following step (1)) and an aging step (the following step (2)) were performed to produce a gel (silicone porous material) having a porous structure. Thereafter, a gel form control step (3), a solvent replacement step (4), and a gel pulverization step (5) were further performed to obtain a coating solution for forming a void-containing layer (sol particle solution). In the present reference example, the gel formation step (3) was performed as a different step from the step (1) as described below. The present invention, however, is not limited thereto, and, for example, the gel form control step (3) may be performed in the step (1).

(1) Gelation of Silicon Compound 9.5 kg of a silicon compound precursor MTMS was dissolved in 0.22 kg of DMSO. To the resultant mixture, 5 kg of 0.01 mol/L oxalic acid aqueous solution was added. The resultant mixture was stirred at room temperature for 120 minutes, whereby MTMS was hydrolyzed to generate tris(hydroxy)methylsilane.

3.8 kg of ammonia water with an ammonia concentration of 28% and 2 kg of pure water were added to 55 kg of DMSO. Thereafter, the above-described mixture that had been subjected to the hydrolysis treatment was further added thereto. The resultant mixture was stirred at room temperature for 60 minutes. Thereafter, the mixture after stirring for 60 minutes was poured into a stainless container with a size of 30 cm in length×30 cm in width×5 cm in height and allowed to stand at room temperature to cause gelation of tris(hydroxy)methylsilane. Thus, a gelled silicon compound.

(2) Aging Step

The gelled silicon compound obtained by the above gelation treatment was subjected to an aging treatment by incubating it at 40° C. for 20 hours. Thus, a cuboid gel mass was obtained. The amount of DMSO (a high-boiling-point solvent with a boiling point of 130° C. or higher) to be used in a raw material of this gel was about 83 wt % relative to the total amount of the raw material. Thus, it is obvious that this gel contains 50 wt % or more of the high-boiling-point solvent with a boiling point of 130° C. or higher. The amount of MTMS (a monomer as a structural unit of the gel) to be used in a raw material of this gel was about 8 wt % relative to the total amount of the raw material. Thus, it is obvious that this gel contains 20 wt % or less of a solvent (methanol in this case) with a boiling point of less than 130° C. to be generated in hydrolysis of the monomer (MTMS) that is a monomer as a structural unit of the gel.

(3) Gel Form Control Step

Water, which is a replacement solvent, was introduced on the gel synthesized in a stainless container with a size of 30 cm×30 cm×5 cm by the steps (1) and (2). Then, a cutting blade of a cutting tool was slowly inserted into the gel in the stainless container from the top to cut the gel into a cuboid each with a size of 1.5 cm×2 cm×5 cm.

(4) Solvent Replacement Step

Next, a solvent replacement step was performed as described in (4-1) to (4-3) below.

(4-1) After the "gel form control step (3)", the gelled silicon compound was immersed in water 8 times the weight of the gelled silicon compound, and stirred slowly for 1 hour so that only water was convected. After 1 hour, the water was replaced with water of the same weight and stirred further for 3 hours. Thereafter, the water was replaced again, and then the water was heated for 3 hours while slowly stirring at 60° C.

(4-2) After (4-1), the water was replaced with isopropyl alcohol 4 times the weight of the gelled silicon compound, and heated for 6 hours while stirring at 60° C.

(4-3) After (4-2), the isopropyl alcohol was replaced with isobutyl alcohol of the same weight and heated for 6 hours at 60° C. to replace the solvent contained in the gelled silicon compound with isobutyl alcohol. As described above, the gel for void-containing layer production of the present invention was produced.

(5) Gel Pulverization Step

The gel (gelled silicon compound) obtained after the concentration measurement (concentration control) and concentration adjustment step (4) was subjected to a total of two stages of pulverization including a first pulverization stage by continuous emulsification dispersion (Milder MDN304, manufactured by Pacific Machinery & Engineering Co., Ltd.) and a second pulverization stage by high pressure media-less pulverization (Star Burst HJP-25005, manufactured by Sugino Machine Limited). This pulverization treatment was performed in the following manner. First, 43.4 kg of the gel after being subjected to solvent replacement was prepared. This gel is a gelled silicon compound containing a solvent. 26.2 kg of isobuyl alcohol was added to 43.4 kg of this gel after being subjected to solvent replacement, and the mixture was then weighed. Thereafter, the mixture was subjected to a first pulverization stage by closed-circuit pulverization for 20 minutes and the second pulverization stage at a pulverization pressure of 100 MPa. Thus, a dispersion solution (sol particle solution) of nanometer-sized particles (pulverized products of the gel) in isobutyl alcohol was obtained. Further, 224 g of methyl isobutyl ketone having 1.5 WPBG-266 (trade name, manufactured by Wako Pure Chemical Industries, Ltd.) was added to 3 kg of the sol particle solution, and 67.2 g of methyl isobutyl ketone having 5% bis(trimethoxylyl)ethane (manufactured by Tokyo Chemical Industry Co., Ltd.) was added thereto, and then 31.8 g of N,N-dimethylformamide was added and mixed, thereby obtaining a coating solution.

In the manner described above, the coating solution for forming void-containing layer (sol particle solution) of the present reference example (Reference Example 1) was produced. The peak pore diameter of the gel pulverized product (microporous particle) in the coating solution for forming void-containing layer (sol particle solution) was measured by the method described above and found to be 12 nm.

Reference Example 2: Formation of Pressure-Sensitive Adhesive/Adhesive Layer

The pressure-sensitive adhesive/adhesive layer of the present reference example (Reference Example 2) was formed by the following procedures (1) to (3).

(1) Preparation of Acrylic Polymer Solution 90.7 parts of butyl acrylate, 6 parts of N-acryloyl morpholine, 3 parts of acrylic acid, 0.3 parts of 2-hydroxybutyl acrylate, and 0.1 parts by weight of 2,2'-azobisisobutyronitrile as a polymerization initiator were put into a four-neck flask equipped with a stirring blade, a thermometer, a nitrogen gas inlet tube, and a cooler together with 100 g of ethyl acetate. Subsequently, nitrogen gas was introduced while gently stirring the contents of the four-neck flask to perform nitrogen replacement. Thereafter, a polymerization reaction was performed for 8 hours while maintaining the solution temperature in the four-neck flask at about 55° C., thereby preparing an acrylic polymer solution.

(2) Preparation of Acrylic Pressure-Sensitive Adhesive Composition

To 100 parts of the solid content of the acrylic polymer solution obtained in the (1) above, 0.2 parts of an isocyanate crosslinking agent (trade name: "Coronate L" manufactured by Nippon Polyurethane Industry Co., Ltd., an adduct of trimethylolpropane with trilene diisocyanate), 0.3 parts of benzoyl peroxide (trade name: "NYPER BMT" manufactured by NOF CORPORATION), and 0.2 parts of γ-glycidoxypropylmethoxysilane (trade name: "KBM-403" manufactured by Shin-Etsu Chemical Co., Ltd.) were added, thereby preparing an acrylic pressure-sensitive adhesive composition (acrylic pressure-sensitive adhesive solution).

(3) Formation of Pressure-Sensitive Adhesive/Adhesive Layer

The acrylic pressure-sensitive adhesive composition prepared in the (2) above was coated onto one side of a silicone-treated polyethylene terephthalate (PET) film (manufactured by Mitsubishi Chemical Polyester Film Corporation, thickness: 38 μm) so that the thickness of the pressure-sensitive adhesive layer after being dried achieves 12 μm, and the coated acrylic pressure-sensitive adhesive composition was dried at 150° C. for 3 minutes, thereby forming a pressure-sensitive adhesive layer (pressure-sensitive adhesive/adhesive layer). The storage elastic modulus G' of the pressure-sensitive adhesive layer (pressure-sensitive adhesive/adhesive layer) at 23° C. was $1.3 \times 10^5$.

Reference Example 3: Formation of Pressure-Sensitive Adhesive/Adhesive Layer

The pressure-sensitive adhesive/adhesive layer of the present reference example (Reference Example 3) was formed by the following procedures (1) to (3).

(1) Preparation of Acrylic Polymer Solution 96.9 parts of butyl acrylate, 3 parts of acrylic acid, 0.1 part of 2-hydroxyethyl acrylate, and 0.1 parts of 2,2'-azobisisobutyronitrile as a polymerization initiator were put into a four-neck flask equipped with a stirring blade, a thermometer, a nitrogen gas inlet tube, and a cooler together with 100 g of ethyl acetate. Subsequently, nitrogen gas was introduced while gently stirring the contents of the four-neck flask to perform nitrogen replacement. Thereafter, a polymerization reaction was performed for 8 hours while maintaining the solution temperature in the four-neck flask at about 55° C., thereby preparing an acrylic polymer solution.

(2) Preparation of Acrylic Pressure-Sensitive Adhesive Composition

To 100 parts of the solid content of the acrylic polymer solution obtained in the (1) above, 0.5 parts of an isocyanate crosslinking agent (trade name: "Coronate L" manufactured by Nippon Polyurethane Industry Co., Ltd., an adduct of trimethylolpropane with trilene diisocyanate), 0.2 parts of benzoyl peroxide (trade name: "NYPER BMT" manufactured by NOF CORPORATION), and 0.2 parts of γ-glycidoxypropylmethoxysilane (trade name: "KBM-403" manufactured by Shin-Etsu Chemical Co., Ltd.) were added, thereby preparing an acrylic pressure-sensitive adhesive composition solution.

(3) Formation of Pressure-Sensitive Adhesive/Adhesive Layer

The acrylic pressure-sensitive adhesive composition solution prepared in the (2) above was coated onto one side of a silicone-treated polyethylene terephthalate (PET) film (manufactured by Mitsubishi Chemical Polyester Film Corporation, thickness: 38 μm) so that the thickness of the pressure-sensitive adhesive layer after drying achieves 20 μm, and the coated acrylic pressure-sensitive adhesive composition was dried at 150° C. for 3 minutes, thereby forming a pressure-sensitive adhesive layer (pressure-sensitive adhesive/adhesive layer). The storage elastic modulus G' of the pressure-sensitive adhesive layer (pressure-sensitive adhesive/adhesive layer) at 23° C. was $1.1 \times 10^5$.

Reference Example 4: Formation of Pressure-Sensitive Adhesive/Adhesive Layer

The pressure-sensitive adhesive/adhesive layer of the present reference example (Reference Example 4) was formed by the following procedures (1) to (3).

(1) Preparation of Acrylic Polymer Solution 77 parts of butyl acrylate, 20 parts of phenoxyethyl acrylate, 2 parts of N-vinyl-2-pyrrolidone, 0.5 parts of acrylic acid, 0.5 parts of 4-hydroxybutyl acrylate, and 0.1 parts of 2,2'-azobisisobutyronitrile as a polymerization initiator were put into a four-neck flask equipped with a stirring blade, a thermometer, a nitrogen gas inlet tube, and a cooler together with 100 parts of ethyl acetate. Subsequently, nitrogen gas was introduced while gently stirring the contents of the four-neck flask to perform nitrogen replacement. Thereafter, a polymerization reaction was performed for 8 hours while maintaining the solution temperature in the four-neck flask at about 55° C., thereby preparing an acrylic polymer solution.

(2) Preparation of Acrylic Pressure-Sensitive Adhesive Composition

To 100 parts of the solid content of the acrylic polymer solution obtained in the (1) above, 0.1 parts of an isocyanate crosslinking agent (trade name: "TAKENATE D160N" manufactured by Mitsui Chemicals, Inc., trimethylolpropane hexamethylene diisocyanate), 0.3 parts of benzoyl peroxide (trade name: "NYPER BMT" manufactured by NOF CORPORATION), and 0.2 parts of γ-glycidoxypropylmethoxysilane (trade name: "KBM-403" manufactured by Shin-Etsu Chemical Co., Ltd.) were added, thereby preparing an acrylic pressure-sensitive adhesive composition solution.

(3) Formation of Pressure-Sensitive Adhesive/Adhesive Layer

The acrylic pressure-sensitive adhesive composition solution prepared in the (2) above was coated onto one side of a polyethylene terephthalate (PET) film (separator film: manufactured by Mitsubishi Chemical Polyester Film Corporation, trade name "MRF38") that has been treated with a silicone separator, and the coated acrylic pressure-sensitive adhesive composition solution was dried at 150° C. for 3 minutes, thereby forming a pressure-sensitive adhesive layer (pressure-sensitive adhesive/adhesive layer) having a thickness of 20 μm on the surface of the separator film. The storage elastic modulus G' of the pressure-sensitive adhesive layer (pressure-sensitive adhesive/adhesive layer) at 23° C. was $1.1 \times 10^5$.

Reference Example 5: Formation of Pressure-Sensitive Adhesive/Adhesive Layer

The pressure-sensitive adhesive/adhesive layer of the present reference example (Reference Example 5) was formed by the following procedures (1) to (3).

(1) Preparation of Prepolymer Composition 0.035 parts of photopolymerization initiator (trade name: "Irgacure 184", BASF) and 0.035 parts of photopolymerization initiator (trade name: "Irgacure 651", BASF) were added to a monomer mixture composed of 68 parts of 2-ethylhexyl acrylate, 14.5 parts of N-vinyl-2-pyrrolidone, and 17.5 parts of 2-hydroxyethyl acrylate, and then the resultant was irradiated with ultraviolet rays until the viscosity (BH viscosity meter No. 5 rotor, 10 rpm, measurement temperature 30° C.) reached about 20 Pa·s, thereby obtaining a prepolymer composition in which parts of the monomer components were polymerized.

(2) Preparation of Acrylic Pressure-Sensitive Adhesive Composition

To the prepolymer composition obtained in the (1) above, 0.150 parts of hexanediol diacrylate (HDDA) and 0.3 parts of silane coupling agent (trade name "KBM-403", Shin-Etsu Chemical Co., Ltd.) were added and mixed, thereby obtaining an acrylic pressure-sensitive adhesive composition.

(3) Formation of Pressure-Sensitive Adhesive/Adhesive Layer

The acrylic pressure-sensitive adhesive composition prepared in the (2) above was coated onto one side of a silicone-treated polyethylene terephthalate (PET) film (manufactured by Mitsubishi Chemical Polyester Film Corporation, thickness: 50 μm) so that the thickness of the pressure-sensitive adhesive layer after being dried achieves 25 μm, and further, a silicone-treated polyethylene terephthalate (PET) film (manufactured by Mitsubishi Chemical Polyester Film Corporation, thickness: 38 μm) was provided on the coating layer to cover the coating layer to block oxygen. Then, the laminate was irradiated with ultraviolet rays at the illuminance of 5 mW/cm2 for 300 seconds from the upper surface (MRF38 side) thereof using a black light (manufactured by TOSHIBA CORPORATION). Further, a drying treatment was performed with a dryer at 90° C. for 2 minutes to volatilize the remaining monomers to form a pressure-sensitive adhesive layer (pressure-sensitive adhesive/adhesive layer). The storage elastic modulus G' of the pressure-sensitive adhesive layer (pressure-sensitive adhesive/adhesive layer) at 23° C. was $1.1 \times 10^5$.

Reference Example 6: Formation of Pressure-Sensitive Adhesive/Adhesive Layer

The pressure-sensitive adhesive/adhesive layer of the present reference example (Reference Example 6) was formed by the following procedures (1) to (3).

(1) Preparation of Acrylic Polymer Solution 99 parts of butyl acrylate, 1 part of 4-hydroxybutyl acrylate, and 0.1 parts of 2,2'-azobisisobutyronitrile as a polymerization initiator were put into a four-neck flask equipped with a stirring blade, a thermometer, a nitrogen gas inlet tube, and a cooler together with 100 parts of ethyl acetate. Subsequently, nitrogen gas was introduced while gently stirring the contents of the four-neck flask to perform nitrogen replacement. Thereafter, a polymerization reaction was performed for 8 hours while maintaining the solution temperature in the four-neck flask at about 55° C., thereby preparing an acrylic polymer solution.

(2) Preparation of Acrylic Pressure-Sensitive Adhesive Composition

To 100 parts of the solid content of the acrylic polymer solution obtained in the (1) above, 0.1 parts of an isocyanate crosslinking agent (trade name: "TAKENATE D110N" manufactured by MITSUI TAKEDA CHEMICALS, INC., trimethylolpropane xylylene diisocyanate), 0.1 parts of benzoyl peroxide (trade name: "NYPER BMT" manufactured by NOF CORPORATION), and 0.2 parts of γ-glycidoxypropylmethoxysilane (trade name: "KBM-403" manufactured by Shin-Etsu Chemical Co., Ltd.) were added, thereby preparing an acrylic pressure-sensitive adhesive composition solution.

(3) Formation of Pressure-Sensitive Adhesive/Adhesive Layer

The acrylic pressure-sensitive adhesive composition solution prepared in the (2) above was coated onto one side of a polyethylene terephthalate film (separator film: manufactured by Mitsubishi Chemical Polyester Film Corporation, trade name "MRF38") that has been treated with a silicone separator, and the coated acrylic pressure-sensitive adhesive composition solution was dried at 150° C. for 3 minutes, thereby forming a pressure-sensitive adhesive layer (pressure-sensitive adhesive/adhesive layer) having a thickness of 20 μm on the surface of the separator film. The storage elastic modulus G' of the pressure-sensitive adhesive layer (pressure-sensitive adhesive/adhesive layer) at 23° C. was $8.2 \times 10^4$.

Reference Example 7: Formation of Pressure-Sensitive Adhesive/Adhesive Layer

The pressure-sensitive adhesive/adhesive layer of the present reference example (Reference Example 7) was formed by the following procedures (1) to (3).

(1) Preparation of Acrylic Polymer Solution 90.7 parts of butyl acrylate, 6 parts of N-acryloylmorpholine, 3 parts of acrylic acid, 0.3 parts of 2-hydroxybutyl acrylate, and 0.1 wt % of 2,2'-azobisisobutyronitrile as a polymerization initiator were put into a four-neck flask equipped with a stirring blade, a thermometer, a nitrogen gas inlet tube, and a cooler together with 100 g of ethyl acetate. Subsequently, nitrogen gas was introduced while gently stirring the contents of the four-neck flask to perform nitrogen replacement. Thereafter, a polymerization reaction was performed for 8 hours while maintaining the solution temperature in the four-neck flask at about 55° C., thereby preparing an acrylic polymer solution.

(2) Preparation of Acrylic Pressure-Sensitive Adhesive Composition

To 100 parts of the solid content of the acrylic polymer solution obtained in the (1) above, 0.15 parts of an isocyanate crosslinking agent (trade name: "Coronate L" manufactured by Nippon Polyurethane Industry Co., Ltd., adduct of tolylene diisocyanate of trimethylolpropane), 0.2 parts of benzoyl peroxide (trade name: "NYPER BMT" manufactured by NOF CORPORATION), and 0.2 parts of γ-glycidoxypropylmethoxysilane (trade name: "KBM-403" manufactured by Shin-Etsu Chemical Co., Ltd.) were added, thereby preparing an acrylic pressure-sensitive adhesive composition (acrylic pressure-sensitive adhesive solution).

(3) Formation of Pressure-Sensitive Adhesive/Adhesive Layer

The acrylic pressure-sensitive adhesive composition solution prepared in the (2) above was coated onto one side of a polyethylene terephthalate film (separator film: manufactured by Mitsubishi Chemical Polyester Film Corporation, trade name "MRF38") that has been treated with a silicone separator, and the coated acrylic pressure-sensitive adhesive composition solution was dried at 150° C. for 3 minutes, thereby forming a pressure-sensitive adhesive layer (pressure-sensitive adhesive/adhesive layer) having a thickness of 75 μm on the surface of the separator film. The storage elastic modulus G' of the pressure-sensitive adhesive layer (pressure-sensitive adhesive/adhesive layer) at 23° C. was $1.0 \times 10^5$.

Reference Example 8: Formation of Pressure-Sensitive Adhesive/Adhesive Layer

The pressure-sensitive adhesive/adhesive layer of the present reference example (Reference Example 8) was formed by the following procedures (1) to (3).

(1) Preparation of Acrylic Polymer Solution 95 parts of butyl acrylate, 5 parts of acrylic acid, and 0.1 parts of 2,2'-azobisisobutyronitrile as a polymerization initiator were put into a four-neck flask equipped with a stirring blade, a thermometer, a nitrogen gas inlet tube, and a cooler together with 100 g of ethyl acetate. Subsequently, nitrogen gas was introduced while gently stirring the contents of the four-neck flask to perform nitrogen replacement. Thereafter, a polymerization reaction was performed for 8 hours while maintaining the solution temperature in the four-neck flask at about 55° C., and then the temperature of the liquid in the flask was raised to 70° C. and the reaction was performed for 2 hours, thereby preparing an acrylic polymer solution.

(2) Preparation of Acrylic Pressure-Sensitive Adhesive Composition

To 100 parts of the solid content of the acrylic polymer solution obtained in the (1) above, 0.7 parts of an isocyanate crosslinking agent (trade name: "Coronate L" manufactured by Nippon Polyurethane Industry Co., Ltd., adduct of tolylene diisocyanate of trimethylolpropane), 0.2 parts of benzoyl peroxide (trade name: "NYPER BMT" manufactured by NOF CORPORATION), and 0.2 parts of γ-glycidoxypropylmethoxysilane (trade name: "KBM-403" manufactured by Shin-Etsu Chemical Co., Ltd.) were added, thereby preparing an acrylic pressure-sensitive adhesive composition solution.

(3) Formation of Pressure-Sensitive Adhesive/Adhesive Layer

The acrylic pressure-sensitive adhesive composition solution prepared in the (2) above was coated onto one side of a polyethylene terephthalate film (separator film: manufactured by Mitsubishi Chemical Polyester Film Corporation, trade name "MRF38") that has been treated with a silicone separator, and the coated acrylic pressure-sensitive adhesive composition solution was dried at 150° C. for 3 minutes, thereby forming a pressure-sensitive adhesive layer (pressure-sensitive adhesive/adhesive layer) having a thickness of 75 μm on the surface of the separator film. The storage elastic modulus G' of the pressure-sensitive adhesive layer (pressure-sensitive adhesive/adhesive layer) at 23° C. was $7.7 \times 10^4$.

Example 1

The coating solution for forming a high void fraction layer prepared in Reference Example 1 was coated on an acrylic base and the coated high void fraction layer was dried, thereby forming a void-containing layer having a thickness of about 850 nm (void fraction: 59 vol %). Then the resultant was irradiated with UV (300 mJ) from the surface of the void-containing layer. Thereafter, the pressure-sensitive adhesive having a thickness of 12 μm obtained in Reference Example 2 was adhered to the surface of the void-containing layer, and the resultant was subjected to aging treatment at 60° C. for 20 hours, thereby producing a laminate of the present example.

Further, the laminate of the present example produced as described above was put into an oven at 85° C. and at 85% RH to perform a heat/humidification durability test for 500 hours. The degree of filling of the voids in the void-containing layer after the heat/humidification durability test was examined with SEM, and the void remaining ratio was calculated. The results are shown in Table 1.

Example 2

The laminate of the present example was produced by performing the same operations as in Example 1 except that the pressure-sensitive adhesive obtained in Reference Example 3 was used instead of the pressure-sensitive adhesive of Reference Example 2. Further, the heat/humidification durability test was conducted in the same manner as in Example 1, and the void remaining ratio was calculated. The results are shown in Table 1.

Example 3

The laminate of the present example was produced by performing the same operations as in Example 1 except that the pressure-sensitive adhesive obtained in Reference Example 4 was used instead of the pressure-sensitive adhesive of Reference Example 2. Further, the heat/humidification durability test was conducted in the same manner as in Example 1, and the void remaining ratio was calculated. The results are shown in Table 1.

Example 4

The laminate of the present example was produced by performing the same operations as in Example 1 except that the pressure-sensitive adhesive obtained in Reference Example 5 was used instead of the pressure-sensitive adhesive of Reference Example 2. Further, the heat/humidification durability test was conducted in the same manner as in Example 1, and the void remaining ratio was calculated. The results are shown in Table 1.

Example 5

The laminate of the present example was produced by performing the same operations as in Example 1 except that the thickness of the pressure-sensitive adhesive/adhesive layer formed by the pressure-sensitive adhesive of Reference Example 2 was 5 μm. Further, the heat/humidification durability test was conducted in the same manner as in Example 1, and the void remaining ratio was calculated. The results are shown in Table 1.

Example 6

The laminate of the present example was produced by performing the same operations as in Example 1 except that the pressure-sensitive adhesive obtained in Reference Example 7 was used instead of the pressure-sensitive adhesive of Reference Example 2. Further, the heat/humidification durability test was conducted in the same manner as in Example 1, and the void remaining ratio was calculated. The results are shown in Table 1.

Comparative Example 1

The laminate of the present comparative example was produced by performing the same operations as in Example 1 except that the pressure-sensitive adhesive obtained in Reference Example 6 was used instead of the pressure-sensitive adhesive of Reference Example 2. Further, the heat/humidification durability test was conducted in the same manner as in Example 1, and the void remaining ratio was calculated. The results are shown in Table 1.

Comparative Example 2

The laminate of the present comparative example was produced by performing the same operations as in Example 1 except that epoxy adhesive semi-cured by ultraviolet irradiation (UV) was used instead of the pressure-sensitive adhesive of Reference Example 2. Further, the heat/humidification durability test was conducted in the same manner as in Example 1, and the void remaining ratio was calculated. The results are shown in Table 1.

Comparative Example 3

The laminate of the present comparative example was produced by performing the same operations as in Example 1 except that the pressure-sensitive adhesive obtained in Reference Example 8 was used instead of the pressure-sensitive adhesive of Reference Example 2. Further, the heat/humidification durability test was conducted in the same manner as in Example 1, and the void remaining ratio was calculated. The results are shown in Table 1.

Then, the adhesive force of each of the laminates obtained in Examples 1 to 6 and Comparative Examples 1 to 3 was measured by the above-described measurement method. In addition, the storage elastic modulus of the pressure-sensitive adhesive/adhesive layer at 23° C., the gel fraction of the pressure-sensitive adhesive/adhesive layer, the thickness of the intermediate layer, the thickness of the pressure-sensitive adhesive/adhesive layer, and the weight-average molecular weight of the sol component of the pressure-sensitive adhesive/adhesive layer were measured by the above-described measurement methods. Further, the void portion was binarized from the SEM image of the laminate after the durability test, and the void remaining ratio was calculated. The results are also shown in Table 1.

TABLE 1

| | Ex. 1 | Ex. 2 | Ex. 3 | Ex. 4 | Ex. 5 | Ex. 6 | Comp. Ex. 1 | Comp. Ex. 2 | Comp. Ex. 3 |
|---|---|---|---|---|---|---|---|---|---|
| Void fraction of void-containing layer (vol %) | 59% | 59% | 59% | 59% | 59% | 59% | 59% | 59% | 59% |
| Refractive index of void-containing layer | 1.18 | 1.18 | 1.18 | 1.18 | 1.18 | 1.18 | 1.18 | 1.18 | 1.18 |
| Thickness of intermediate layer | 50 nm | 60 nm | 60 nm | 60 nm | 35 nm | 120 nm | 60 nm | 100 nm | 230 nm |
| Void remaining ratio of void-containing layer after durability test | >85% | >54% | >55% | >60% | >90% | >51% | <10% | <10% | <10% |
| Increasing rate of thickness of intermediate layer after | 160% | 280% | 330% | 300% | 100% | 440% | >500% | >500% | >500% |
| Pressure-sensitive adhesive force | 1.5N/25 mm | 1.8N/25 mm | 2.1N/25 mm | 2.3N/25 mm | 0.8N/25 mm | 5.6N/25 mm | >10N/25 mm | >10N/25 mm | >10N/25 mm |
| Storage elastic modulus G' of pressure-sensitive adhesive/adhesive layer | $1.3 \times 10^5$ | $1.1 \times 10^5$ | $1.1 \times 10^5$ | $1.1 \times 10^5$ | $1.3 \times 10^5$ | $1.0 \times 10^5$ | $8.2 \times 10^4$ | — | $7.7 \times 10^4$ |
| Thickness X of pressure-sensitive adhesive/adhesive layer | 12 μm | 20 μm | 20 μm | 25 μm | 5 μm | 40 μm | 20 μm | 12 μm | 75 μm |
| Gel fraction Y of pressure-sensitive adhesive/adhesive layer (%) | 90% | 80% | 82% | 95% | 90% | 75% | 50% | — | 60% |
| [(100 − X)/100] × Y | 1.2 | 4 | 3.6 | 1.25 | 0.5 | 10 | 6 | — | 30 |
| Weight-average molecular weight Mw of sol component of pressure-sensitive | 280,000 | 370,000 | 320,000 | 70,000 | 280,000 | 460,000 | 720,000 | — | 620,000 |

TABLE 1-continued

| | Ex. 1 | Ex. 2 | Ex. 3 | Ex. 4 | Ex. 5 | Ex. 6 | Comp. Ex. 1 | Comp. Ex. 2 | Comp. Ex. 3 |
|---|---|---|---|---|---|---|---|---|---|
| Content of low molecular weight component having a molecular weight of 10,000 or less in sol component of pressure-sensitive | 10% | 9% | 17% | 20% | 10% | 6% | 8% | — | 33% |

As shown in Table 1, the laminates obtained in Examples 1 to 6 achieved both the pressure-sensitive adhesive force and the reduction of a tendency of a pressure-sensitive adhesive (pressure-sensitive adhesive/adhesive layer) to penetrate into voids. In contrast, in the laminates of Comparative Examples 1 to 3, a pressure-sensitive adhesive (pressure-sensitive adhesive/adhesive layer) permeated into the voids of the void-containing layer, and the void remaining ratio of the void-containing layer after the durability test was low.

INDUSTRIAL APPLICABILITY

As described above, the present invention can provide a laminate of a void-containing layer and a pressure-sensitive adhesive/adhesive layer that achieves both a pressure-sensitive adhesive force or an adhesive force and a reduction of a tendency of a pressure-sensitive adhesive or an adhesive to penetrate into voids, and can also provide an optical member and an optical apparatus including the laminate. The application of the present invention is not particularly limited. For example, the optical apparatus of the present invention is not particularly limited, and may be an image display device, an illumination device, or the like. Examples of the image display device include a liquid crystal display, an organic EL display, and a micro LED display. The illumination device may be, for example, an organic EL illumination, or the like. Further, the application of the laminate of the present invention is not limited to the optical member and the optical device of the present invention, and can be used in a wide range of applications.

This application claims priority from Japanese Patent Application No. 2017-190746 filed on Sep. 29, 2017 and Japanese Patent Application No. 2018-180954 filed on Sep. 26, 2018. The entire subject matter of the Japanese Patent Applications is incorporated herein by reference.

REFERENCE SIGNS LIST

10: base
20: void-containing layer
20': coating film (after drying)
20": sol particle solution
21: void-containing layer with improved strength
22: intermediate layer
30: pressure-sensitive adhesive/adhesive layer
101: delivery roller
102: coating roller
110: oven zone
111: hot air fan (heating unit)
120: chemical treatment zone
121: lamp (light irradiation unit) or hot air fan (heating unit)
130a: pressure-sensitive adhesive/adhesive layer coating zone
130: intermediate layer forming zone
131a: pressure-sensitive adhesive/adhesive layer coating unit
131: hot air fan (heating unit)
105: winding roller
106: roller
201: delivery roller
202: solution reservoir
203: doctor (doctor knife)
204: micro-gravure coater
210: oven zone
211: heating unit
220: chemical treatment zone
221: light irradiation unit or heating unit
230a: pressure-sensitive adhesive/adhesive layer coating zone
230: intermediate layer forming zone
231a: pressure-sensitive adhesive/adhesive layer coating unit
231: hot air fan (heating unit)
251: winding roller

The invention claimed is:

1. A laminate comprising:
a void-containing layer; and
a pressure-sensitive adhesive/adhesive layer, wherein
the pressure-sensitive adhesive/adhesive layer is directly laminated on one or both sides of the void-containing layer,
the void-containing layer has a void fraction of 35 vol % or more, and
after a heat/humidification durability test of holding at a temperature of 85° C. and a relative humidity of 85% for 500 hours, a void remaining ratio of the void-containing layer is 50 vol % or more of the void remaining ratio before the heat/humidification durability test
the pressure-sensitive adhesive/adhesive layer is formed of a pressure-sensitive adhesive containing a (meth) acrylic polymer and a crosslinking agent,
the pressure-sensitive adhesive/adhesive layer has a storage elastic modulus of $1.0 \times 10^5$ or more at 23° C.
the pressure-sensitive adhesive/adhesive layer has a gel fraction of 70% or more,
the pressure-sensitive adhesive/adhesive layer has a thickness of 2 to 50 μm, and
the pressure-sensitive adhesive/adhesive layer satisfies the following equation (I):

$$[(100-X)/100] \times Y \leq 10 \quad (I)$$

where in the equation (I),
X is the gel fraction (%) of the pressure-sensitive adhesive/adhesive layer, and
Y is the thickness (μm) of the pressure-sensitive adhesive/adhesive layer.

2. The laminate according to claim 1, wherein
the void remaining ratio of the void-containing layer after the heat/humidification durability test is more than 50% and 99% or less of the void remaining ratio when only the void-containing layer is subjected to the heat/humidification durability test.

3. The laminate according to claim 1, wherein
the void-containing layer and the pressure-sensitive adhesive/adhesive layer are laminated through an intermediate layer,
the intermediate layer is a layer formed by combining a part of the void-containing layer and a part of the pressure-sensitive adhesive/adhesive layer,
the intermediate layer has a thickness of 200 nm or less, and
after the heat/humidification durability test, an increasing rate of the thickness of the intermediate layer is 500% or less with respect to the thickness of the intermediate layer before the heat/humidification durability test.

4. The laminate according to claim 1, wherein
in a molecular weight measurement of the pressure-sensitive adhesive/adhesive layer by gel permeation chromatography,
a weight-average molecular weight of a sol component of the pressure-sensitive adhesive/adhesive layer is 50,000 to 500,000, and
a content of a low molecular weight component having a molecular weight of 10,000 or less in the sol component of the pressure-sensitive adhesive/adhesive layer is 20 wt % or less.

5. The laminate according to claim 1, wherein
the void-containing layer and the pressure-sensitive adhesive/adhesive layer are laminated through an intermediate layer,
the intermediate layer is a layer formed by combining a part of the void-containing layer and a part of the pressure-sensitive adhesive/adhesive layer, and
the intermediate layer has a thickness of 200 nm or less.

6. The laminate according to claim 1, wherein
after a heat/humidification durability test of holding at a temperature of 85° C. and a relative humidity of 85% for 500 hours, an increasing rate of the thickness of the intermediate layer is 500% or less with respect to the thickness of the intermediate layer before the heat/humidification durability test.

7. The laminate according to claim 1, wherein
in the pressure-sensitive adhesive/adhesive layer, the (meth)acrylic polymer is crosslinked by the crosslinking agent to form a crosslinked structure.

8. The laminate according to claim 1 wherein,
the (meth)acrylic polymer is a (meth)acrylic polymer having a weight-average molecular weight of 1,500,000 to 2,800,000 obtained by polymerizing 3 to 10 wt % of heterocycle-containing acrylic monomer, 0.5 to 5 wt % of (meth)acrylic acid, 0.05 to 2 wt % of hydroxyalkyl (meth)acrylate, and 83 to 96.45 wt % of alkyl (meth)acrylate as monomer components.

9. The laminate according to claim 1, wherein
the void-containing layer has a refractive index of 1.25 or less.

10. The laminate according to claim 1, wherein
the pressure-sensitive adhesive/adhesive layer is formed of an optical acrylic pressure-sensitive adhesive having a total light transmittance of 85% or more and a haze of 3% or less.

11. An optical member comprising:
the laminate according to claim 1.

12. An optical apparatus comprising:
the optical member according to claim 11.

* * * * *